(12) United States Patent
Cheng et al.

(10) Patent No.: US 8,724,509 B2
(45) Date of Patent: May 13, 2014

(54) MOBILE COMMUNICATION METHOD, MOBILE COMMUNICATION SYSTEM, AND CORRESPONDING APPARATUS

(75) Inventors: Hong Cheng, Singapore (SG); Tien Ming Benjamin Koh, Singapore (SG); Shinkichi Ikeda, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/258,357

(22) PCT Filed: Apr. 5, 2010

(86) PCT No.: PCT/JP2010/002476
§ 371 (c)(1),
(2), (4) Date: Oct. 26, 2011

(87) PCT Pub. No.: WO2010/113528
PCT Pub. Date: Oct. 7, 2010

(65) Prior Publication Data
US 2012/0039213 A1 Feb. 16, 2012

(30) Foreign Application Priority Data

Apr. 3, 2009 (JP) ................................. 2009-090942
Jun. 29, 2009 (JP) ................................. 2009-153375
Feb. 19, 2010 (JP) ................................. 2010-034352

(51) Int. Cl.
*H04W 40/02* (2009.01)
(52) U.S. Cl.
USPC ........................................................ 370/254
(58) Field of Classification Search
USPC ........................................................ 370/254
See application file for complete search history.

(56) References Cited

U.S. PATENT DOCUMENTS

| 2006/0234702 A1* | 10/2006 | Wiberg et al. | 455/432.3 |
| 2007/0253359 A1 | 11/2007 | Hall et al. | |
| 2010/0054217 A1* | 3/2010 | Oulai | 370/338 |
| 2012/0269162 A1* | 10/2012 | Vesterinen et al. | 370/331 |

FOREIGN PATENT DOCUMENTS

| WO | 2008/108716 | 9/2008 |
| WO | 2008/125729 | 10/2008 |
| WO | 2008/132163 | 11/2008 |
| WO | 2008/155347 | 12/2008 |
| WO | 2009/029009 | 3/2009 |

OTHER PUBLICATIONS

"3rd Generation Partnership Project; Technical Specification Group Services and System Aspects; Architecture aspects of Home NodeB and Home eNodeB (Release 9)," 3GPP TR 23.830 V0.3.0, Technical Report, Feb. 2009, 41 pages.

(Continued)

*Primary Examiner* — Sulaiman Nooristany
(74) *Attorney, Agent, or Firm* — Seed IP Law Group PLLC

(57) ABSTRACT

The present invention introduces a method for the network to optimize the route for user's local IP access, without affecting the access to operator's core network. With this mechanism, no excessive signalling is needed for the optimization. The present invention is also applicable to the corporate network that has multiple home NodeBs or home eNodeBs. Finer grain control on the services to be provided over different home NodeB or home eNodeB is also possible. Further, path optimization and continuation of the service upon handover can be controlled, and hence flexibility of the service can be secured.

2 Claims, 14 Drawing Sheets

(56) References Cited

OTHER PUBLICATIONS

International Search Report dated Aug. 5, 2010.
3GPP TS 22.220 V1.0.1, "3rd Generation Partnership Project; Technical Specification Group Services and System Aspects; Service requirements for Home NodeBs and Home eNodeBs (Release 9)," Dec. 2008, pp. 1-21, p. 2, Line 2.
3GPP TSG-SA1 #43, "Check up of Editors notes in TS 22.220," Editor of TS 22.220 (NEC), S1-084111, Nov. 17-21, 2008, pp. 1-2.
Technical Specification Group Services and System Aspects, "Presentation for Information of TS 22.220, Version 1.0.0, on Home Node B (HNB) and Home eNodeB (HeNB)," SA1 (S1-084247 + S1-084249), SP-080790, Dec. 8-11, 2008, pp. 1-2.
3GPP TS 23.401 V8.4.0, "3rd Generation Partnership Project; Technical Specification Group Services and System Aspects; General Packet Radio Service (GPRS) enhancements for Evolved Universal Terrestrial Radio Access Network (E-UTRAN) access (Release 8)," Dec. 2008, pp. 1-219, p. 2, Line 4.
3GPP TS 23.830 V0.3.0, "3rd Generation Partnership Project; Technical Specification Group Services and System Aspects; Architecture aspects of Home NodeB and Home eNodeB (Release 9)," Feb. 2009, pp. 1-41. p. 2, Line 7.
3GPP TS 24.301 V8.0.0, "3rd Generation Partnership Project; Technical Specification Group Core Network and Terminals; Non-Access-Stratum (NAS) protocol for Evolved Packet System (EPS) Stage 3 (Release 8)," Dec. 2008, pp. 1-221, p. 2, Line 9.
3GPP TS 36.331 V8.4.0, "3rd Generation Partnership Project; Technical Specification Group Radio Access Network; Evolved Universal Terrestrial Radio Access (E-UTRA) Radio Resource Control (RRC); Protocol specification (Release 8)," Dec. 2008, pp. 1-198, p. 2, Line 11.

\* cited by examiner

MOBILE COMMUNICATION METHOD, MOBILE COMMUNICATION SYSTEM, AND CORRESPONDING APPARATUS

TECHNICAL FIELD

This invention relates to data communications network. More specifically, it relates to the management for the local IP access in a mobile communication system.

BACKGROUND ART

With the introduction of consumer premises based access node, e.g. Home NodeB (HNB) or Home eNodeB (HeNB), 3GPP also created use cases for the local IP access [1], where the PGW is collocated in the HNB/HeNB. With the Local IP Access (LIA), a User Equipment (UE) accessing the Close Subscriber Group (CSG) cells of a HNB/HeNB can obtain access to network that is connected to the HNB/HeNB besides the operator's core network. This LIA includes access to the home based network or access to the general Internet without going through the operator's core network. It was also required that the UE can access LIA and the operator's core network at the same time. 3GPP further introduced cases that the UE can access the LIA via a macro-cell.

These new use cases greatly enriched the potential services to be deployed. It also helps to offload some traffic from the core network. Existing operation procedures defined in [2] can be reused to realize these scenarios.

CITATION LIST

Non Patent Literature

[NPL 1] Service requirements for Home Node B (HNB) and Home eNode B (HeNB), 3GPP TS22.220 v 1.0.1 Release 9, 2008-12.

[NPL 2] General Packet Radio Service (GPRS) enhancements for Evolved Universal Terrestrial Radio Access Network (E-UTRAN) access, 3GPP TS23.401 v 8.4.0 Release 8, 2008-12.

[NPL 3] Architecture aspects of Home NodeB and Home eNodeB (Release 9), 3GPP TR23.830 v 0.3.0 Release 9, 2009-02.

[NPL 4] Non-Access-Stratum (NAS) protocol for Evolved Packet System (EPS) Stage 3, 3GPP TR24.301 v 8.0.0 Release 8, 2008-12.

[NPL 5] RRC Protocol Specification, 3GPP TS36.331 v 8.4.0 Release 8, 2008-12.

[NPL 6] Vesterinen, Aalto, Kekki, "Method, Radio System, Mobile Terminal and Base Station for Providing Local Breakout Service", WIPO Patent Application WO 20081125729 A1, 13 Apr. 2007.

SUMMARY OF INVENTION

Technical Problem

However, due to the special architecture of the HNB/HeNB, inefficiency exists for the LIA. Because the HNB/HeNB is connected to the operator's core network via an ISP network, it has limited capability over this link, e.g. bandwidth, delay, etc. According to the architecture of [1], all the traffic from a UE must go through a Serving Gateway (SGW) before reaching the PDN Gateway (PGW) and the destination. This is because of various architecture requirements, for example the need for legal communications interception of data across the mobile operator's network and the need for accounting, etc. However, some of these requirements may not be applicable when the UE is performing LIA locally under the HNB or HeNB. In such a scenario, requiring the LIA traffic to pass through an EPC (Evolved Packet Core) comes with higher cost, resulting in an inefficient, ineffective scenario. If the SGW is in the operator's core network, the LIA traffic of the UE will need to go through the ISP link twice. This would greatly reduce the quality of the service that can be provided for the LIA services.

A possible method to solve this is to move the SGW into the HNB/HeNB. However, this may also create a few other issues. Firstly, the SGW being a control entity is in charge of a few important functions, e.g. charging, legal interception, etc. Therefore, placing it on a consumer premises device may not be appropriate for the operator. Secondly, as a UE can only have one SGW at a time, the SGW also needs to serve UE's access to operator's core network. In this case, if the SGW is collocated with HNB/HeNB, control signaling for the operator's core network access needs to go through the ISP link several times. This kind of delay is not desirable.

Furthermore, the HNB/HeNB doesn't know if it is'possible to optimize the path for LIA service at HNB/HeNB when UE attaches. Based on above, it is obvious that a better solution to the problem is necessary.

In the invention defined in Non-patent Document 6, a UE is configured to detect the availability of a local breakout service to an IP (Internet Protocol) gateway notified from a base station to be connected. The UE configures an Internet protocol stack of the UE so that the local breakout service to the Internet will become available at the same time while maintaining the connection to a 3GPP core network.

However, this solution teaches a case of a local connection to the LIA service (here, Internet access) under the control of the base station providing the local breakout service, but not teach a case of per UE based control or a remote connection from an external access network to the LIA service (e.g., remote access from a macro cell eNB to the LIA network connected to the HeNB). In both cases of the local connection and the remote connection, it is desired to be able to connect to the LIA service in a consistent manner in terms of elimination of processing complexity at the UE. It is also desired to switch over (e.g., hand over) from the local connection to the remote connection or vice versa seamlessly in order to maintain a communication session at the time of movement and improve user convenience. From the above description, it is obvious that a better solution to the problem is necessary.

It is an object of the invention to solve the above discussed problems. In particular, it aims to provide a method to allow UE's LIA traffic optimized without affect the traffic for the access to operator's core network. Another object of the invention is to provide a system that comprises a UE that is capable of obtaining LIA optimization information from the network, and is capable of detecting the cell that supports the LIA optimization and inform the corresponding nodes for the optimization by including relevant information in the radio control signalling.

Solution to Problem

To achieve the above-described object, the present invention provides a path optimization method. The path optimization method includes a sending step at the access node to generate optimization information and send the optimization information through an operator network to the mobile terminal which is attaching to the access node. The path optimization method also includes an obtaining step at the mobile node to receive the optimization information. The path optimization method also includes a deciding step to decide based on the obtained optimization information whether the access node can perform path optimization to the local IP network. The path optimization method also includes an instructing step to send an instruction of path optimization to the access node when the deciding step decides the path optimization is possible. The path optimization method also includes a path optimizing step to receive the instruction of path optimization from the mobile terminal and establish an optimized path to the local IP network.

The present invention provides a UE. The UE has an obtaining unit that receives through an operator network optimization information sent from an access node which the mobile terminal is attaching to. The UE has a deciding unit that decides based on the obtained optimization information whether the access node can perform path optimization to the local IP network. The UE has tynectivunit that generates the an instructing unit that sends an instruction of path optimization to the access node when the deciding unit decides the path optimization is possible.

The present invention provides an access node. The access node has a sending unit that generates optimization information and sends the optimization information through an operator network to a mobile terminal which is attaching to the access node. The access node has a path optimizing unit that receives an instruction of path optimization from the mobile terminal and establishes an optimized path to the local IP network.

The present invention provides a mobile communication system. The mobile communication system has an access node capable of performing path optimization to a local IP network. The mobile communication system has a mobile terminal capable of connecting to the local IP network. The access node has a sending unit that generates optimization information and sends the optimization information through an operator network to the mobile terminal which is attaching to the access node. The access node has a path optimizing unit that receives an instruction of path optimization from the mobile terminal and establishes an optimized path to the local IP network. The mobile terminal has an obtaining unit that receives the optimization information sent from the access node through the operator network. The mobile terminal has a deciding unit that decides based on the obtained optimization information whether the access node can perform path optimization to the local IP network. The mobile terminal has an instructing unit that sends an instruction of path optimization to the access node when the deciding unit decides the path optimization is possible.

Advantageous Effects of Invention

The invention has the advantage of optimizing UE's LIA traffic without affect the traffic for the access to operator's core network. The invention also enables LIA connection from an external access network, so that the UE can connect to a LIA service in a consistent manner, and hence reduce the load on the UE by eliminating processing complexity. Further, upon handover between a HeNB and an external macro base station, the LIA connection can also be maintained seamlessly, improving user convenience.

DESCRIPTION OF EMBODIMENTS

In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details. In the following description, for the purpose of explanation, the 3GPP Long Term Evolution (LTE) and Evolved Packet System (EPS) are used as example access technology and network architecture. However, it will be apparent to anyone skilled in the art that the present invention may be practiced with other access technology and network architecture under the same principle.

Embodiment 1

Figure 1:
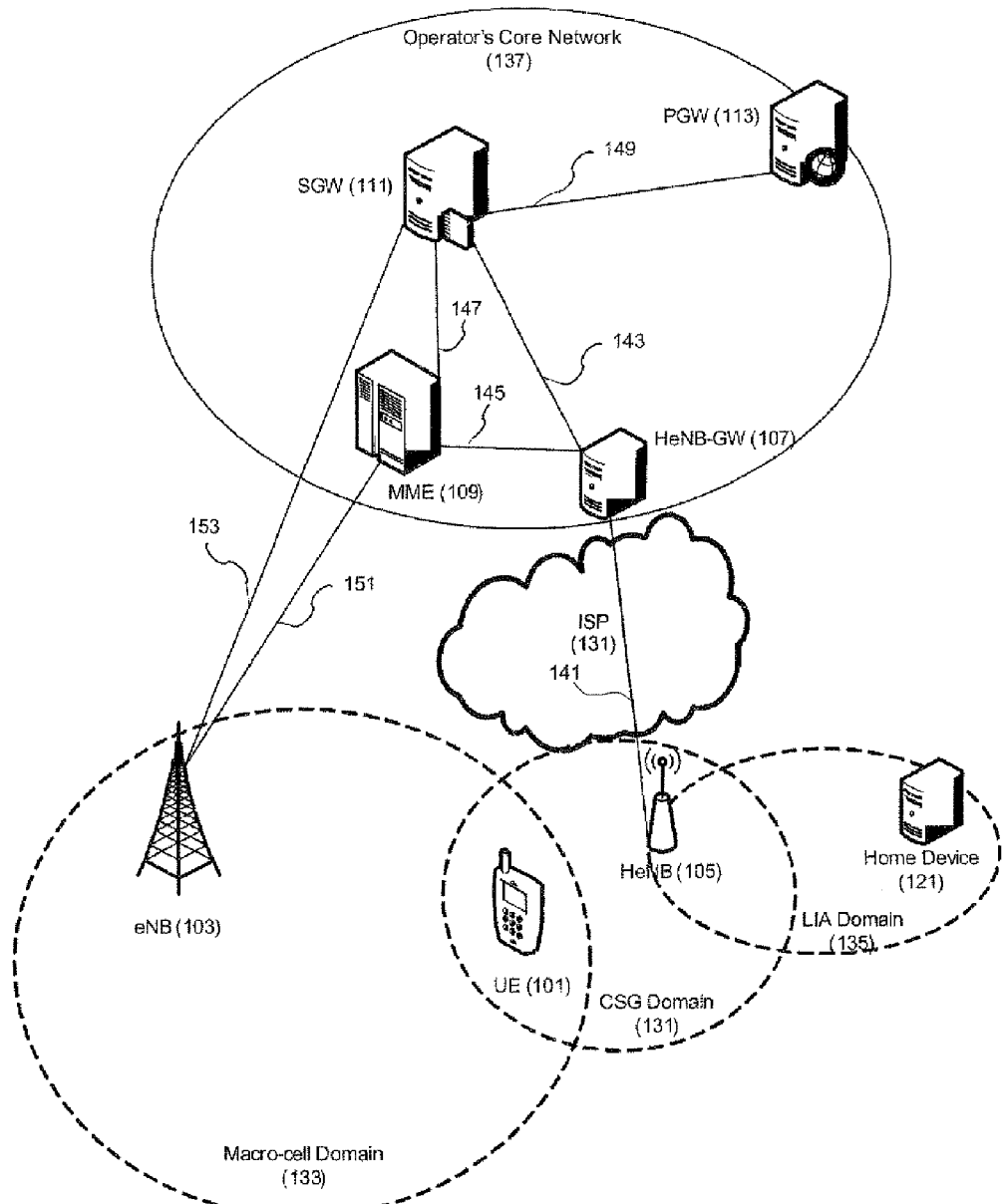
FIG. 1 is an example network architecture that supports the present invention.

With reference to FIG. 1, an example network configuration that the present invention can apply is illustrated. As shown in the figure, an Operator's Core Network (137) can be accessed via different access nodes, e.g. an eNode B (eNB) (103) of the Macro-cell Domain (133), or a Home eNode B (HeNB) (105) of the Closed Subscriber Group (CSG) Domain (131).

The CSG Domain could be deployed in networks in premises, offices, stores, schools, train/ship stations, airports, vehicles, and so on. It could be also installed outside of buildings, e.g. parks, car park etc. The eNB (103) connects to the Operator's Core Network (137) entities Mobility Management Entity (MME) (109) and SGW (111) via interface 151 and 153 respectively. The Interface 151 and 153 corresponds to the S1-MME and S1-U reference point as defined in [2].

The HeNB (105) connects to the Operator's Core Network (137) entities MME (109) and SGW (111) through an ISP (131) domain over link 141 and an optional entity HeNB-GW (107). From HeNB-GW (107), interface 145 and 143 convey the communication between HeNB (105) and MME (109) and SGW (111). Interface 145 and 143 will resemble that of interface 151 and 153 with certain additional function specific for HeNB (105) management and optimization (if the HeNB-GW contains a plurality of HeNBs, a plurality of individual interfaces are aggregated to optimize the traffic).

Similar to that described in [3], the optional HeNB-GW (107) may result in three different connectivity variants between HeNB (105) and MME (109) and SGW (111). It is obvious to anyone skilled in the art that this does not affect the general principle of the present invention. For example, if the HeNB-GW (107) does not exist, it can be assumed that interfaces 143 and 145 terminate directly on HeNB (105) through the ISP (131) domain. Alternatively, if HeNB-GW (107) only resides on control plane, then interface 143 will terminate directly on HeNB (105) through the ISP (131) domain.

Besides connecting to the Operator's Core Network (137), the HeNB (105) also has connection to the Local IP Access (LIA) Domain (135). The HeNB (105) allows UE (101) to access the Home Device (121) in the LIA Domain (135) through the HeNB itself. In this sense, the HeNB (105) provides similar function to that of the PDN Gateway (PGW) (113) in the Operator's Core Network (137). The difference is that the HeNB (105) may not implement the full functions of the PGW (113) as defined in [2], e.g. Lawful Interception, etc, as some are not necessary for LIA. At the same time, the HeNB (105) also provides some optimization for providing the LIA to the UE.

It is obvious to anyone skilled in the art that the Figure only provides the basic illustration of the network architecture for the descriptions of the present invention operation. There are more entities in a real network, e.g. HSS or PCRF, etc, but their existence does not affect the general principle of the invention.

Figure 2:
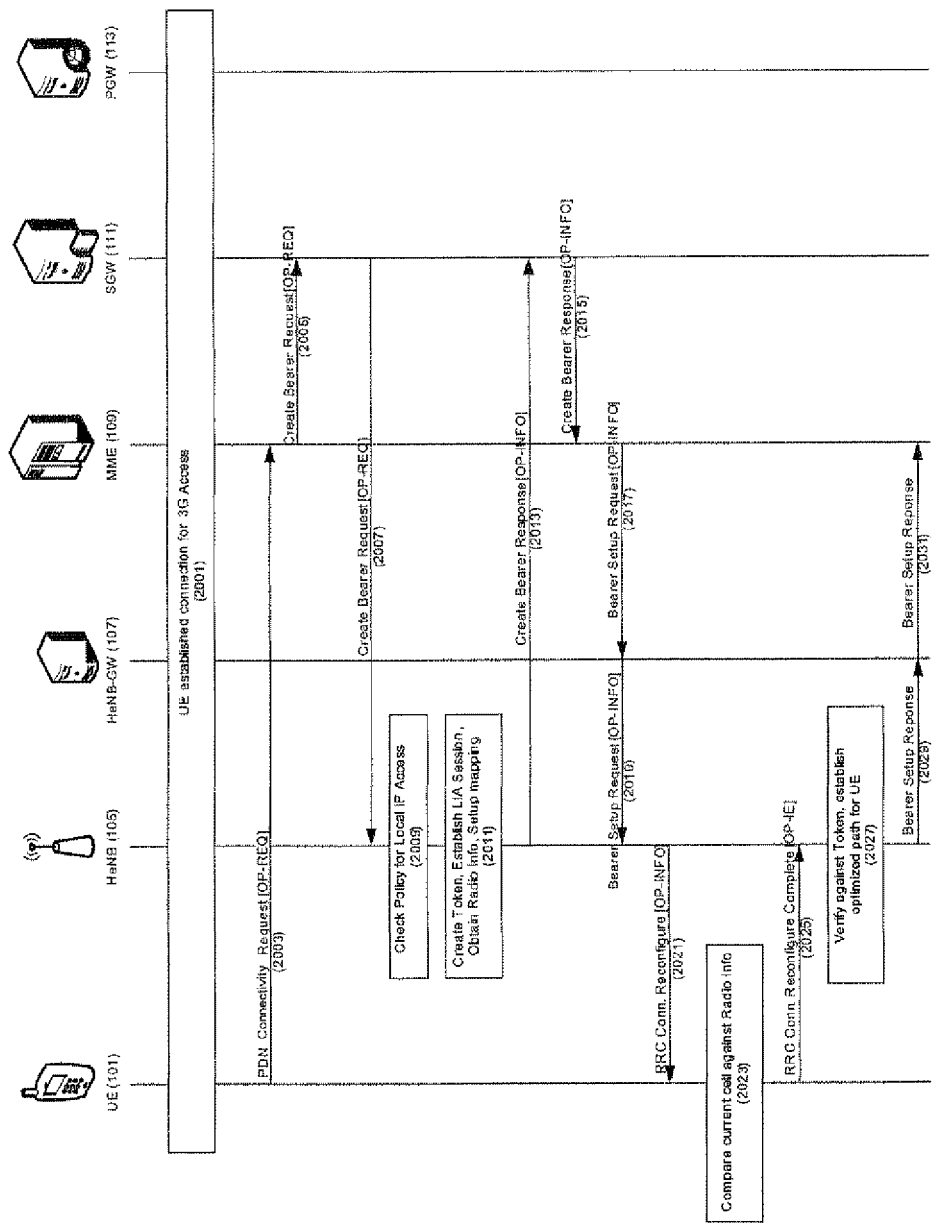
FIG. 2 is an example operation sequence of initiating the LIA inside the CSG Domain.

With reference to FIG. 2, an example operation sequence of the present invention is shown. In this operation sequence, it is assumed that the UE is residing in the CSG Domain (131) when it tries to initiate a Local IP Access. As shown in the figure, UE (101) has already established a connection for accessing services from operator's core network, as in step 2001. This service is provided by a PGW (113) in the Operator's Core Network (137). The procedure for set up this connection can be that of the Service Request procedures as defined in [2].

In order to establish a LIA connection, the UE (101) initiates a new PDN Connectivity Request towards MME (109), as in step 2003. This request is sent as a Non-Access-Stratum (NAS) message, as defined in [4]. Therefore, the HeNB (105) and any intermediary node, e.g. HeNB-GW (107) if exists, forward it transparently to the MME (109).

When the UE (101) has no connection established to the operator's core network, the UE (101) initiates an initial attachment procedure as defined in [2] instead of the PDN Connectivity Procedure.

The UE (101), knowing that it is setting up a LIA connection, e.g. as it uses APN for LIA or it is required by upper layer or application, will indicate its desire for an optimized path and its capability of supporting this present invention in the PDN Connectivity Request (2003) using a Optimization Request (OP-REQ) element. It is obvious to anyone skilled in the art that there are different ways to implement the OP-REQ element in the NAS message. For example, it can be simply a flag, and incorporated into the Protocol Configuration Options (PCO) element, if the UE requested PDN Connectivity procedure is used.

It is obvious that there are other ways for the UE (101) to indicate the OP-REQ information. For example, UE (101) can use a decorated Access Point Name (APN) to carry the same information, e.g. "optimized@localIP.mnc012.mcc 345.gprs". It is obvious that UE (101) can also choose to piggyback into other information elements, or create a new element, as long as the element can reach the PGW function inside the HeNB (105).

In the PDN Connectivity Request (2003), UE (101) also includes other necessary parameters, e.g. APN, PDN Type, Request Type, etc. The values for these parameters are to be set according to criteria defined in [2]. For example, in this case the APN could be "localIP.mnc012.mcc345.gprs", and Request Type could be "initial attach". When the UE (101) initiates the attach procedure for handover from/to other access network, e.g. Non-3GPP access network, the UE (101) could set as Request Type to "handover".

Once received this PDN Connectivity Request (2003), MME (109) resolves the APN and selects a PDN Gateway. To do this, the MME (109) may need to check the UB (101)'s subscription information. For example, the UE (101)'s subscription information may have a fixed PDN Gateway information embedded that corresponds to the Local IP Access APN, e.g. the HeNB in user's home.

In case that the UE (101) can have multiple Local IP Access services, e.g. UE (101) belongs to multiple CSGs, additional information needs to be provided by the UE (101). For example, UE (101) can decorate the APN with the CSG Identifier (CSGID), e.g. "csgid1@localIP.mnc012. mcc345.gprs", or "csgid1.localIP.mnc012. mcc345.gprs".

In order to obtain the actual address of the PDN Gateway for the Local IP Access or a corresponding identifier (FQDN or the like), the MME (109) may need to consult with other network entities. For example, the MME (109) can check with the HeNB-GW (107) or the HeNB (105) about the actual PDN Gateway address when it knows about a CSGID from the APN.

The MME (109) would also exercise the necessary access control for the Local IP Access. For example, it is checked based on subscription information on the UE (101) whether to allow access to the CSG domain that provides the LIA to be connected (e.g., matching of CSG IDs is checked).

After the necessary processing and identify the proper PDN Gateway, in this case the HeNB (105), MME (109) sends a Create Default Bearer Request (2005) message, and sent it towards the SGW (111) of the UE (101). Inside the Create Default Bearer Request (2005), MME (109) copies, into the Create Default Bearer Request message, the OP-REQ information element that is carried in the PDN Connectivity Request (2003), and forwards it.

In the Create Default Bearer Request (2005), MME (109) also include other necessary information elements as defined in [2], e.g. IMSI of the UE (101), PDN GW Address, EPS Bearer ID, etc. The values of these parameters are set according to criteria defined in [2].

After received the Create Default Bearer Request message (2005), the SGW (111) creates corresponding states, and carry out required procedures as defined in [2]. The SGW (111) then forwards the Create Default Bearer Request (2007) to the PDN Gateway as indicated in Create Default Bearer Request message (2005). In this example, it is forwarded to the HeNB (105) (the PGW function placed in the HeNB (105) or the HeNB (105) itself (this description is omitted below as the same is applied)). This Default Bearer Request (2007) also carries the OP-REQ element.

When the HeNB (105) received the Create Default Bearer Request (2007), it will first check its local policy for setting up the Local IP Access (LIA), as in step 2009. This policy may be configured on the HeNB (105) by the operator via a maintenance interface, or manually configured by the HeNB (105) owner (administrator, owner, operator, or device provider), or provisioned by a local policy server. This policy can indicate how the LIA should be provided. For example, it may indicate the bandwidth limitation for a single session, the time period or charging limitation for the LIA allowed for a guest user, if the remote Local IP Access is allowed, what is the priority of the session (which type of session is given priority, e.g., the LIA from the CSG domain is given priority over the remote LIA, or vice versa), or any other service limitations, etc.

Follow the information indicated by the policy, the HeNB (105) sets up the LIA connection to the corresponding device, e.g. Home Device (121) that provides the requested services. In certain case, the policy may indicate the actual device name, identifier or address the LIA can be allowed, for example the IP Address range for the destination. In this case, the HeNB (105) needs to establish the necessary filter for the access.

In order to setup the LIA, the HeNB (105) also needs to exercise the address management function of the PDN Gateway. For example, the HeNB (105) can allocate the IP address to be used by the UE (101) for the LIA. Or, HeNB (105) can obtain an address for the UE (101) from the LIA domain (135), e.g. using DHCP, AAA protocols etc. Or, alternatively, the HeNB (105) can indicate with predefined address, e.g. "0.0.0.0" for IPv4, that DHCP protocol should be used for UE (101) to obtain address.

When the HeNB (105) sees the OP-REQ element in the Create Default Bearer Request (2007), it would know that the UE (101) desires to optimize the LIA connection, and is capable of processing additional information for the optimization. Therefore, the HeNB (105) would further generate an entry in its LIA state database for the UE (101), PGW-LIA-Entry.

In this entry, the HeNB (105) places information elements that are relevant to the LIA connection for the UE. For example, these elements include:

a LIA Verification Token, which is generated per UE, and can be used by HeNB (105) to verify the validity of UE's optimization request later. This could be generated by for example encrypting using a public key of the HeNB of the concatenation of one or more of the following information: the EPS Bearer ID, UE's IMSI, HeNB ID, CSGID, time of the day, ECGI, etc;

LIA Domain Pointer. This is used for the HeNB (105) to identify the destination of the LIA connection for the particular UE (101). It is useful when there are multiple LIA Domains (135) accessible via the same HeNB (105). It is also useful when the LIA Domain (135) is split into different virtual sections, e.g. Virtual LANs, and the UE (101) are only allowed to access part of the sections.

a LIA Filter associated with the LIA connection created based on the UE (101) subscription and LIA Domain (135) local policy. For example, it can be the address filter with the source and destination limited to the UE (101)'s address and Home Device (121)'s address. This information may be dynamic and requires the HeNB (105)'s constant maintenance. For example, after every UE's DHCP request, the HeNB (105) needs to update this filter.

EPS Bearer ID/IDs, which allows the HeNB (105) to know which EPS Bearer this LIA session corresponds to.

Radio Information of the cells that can provide optimization for the LIA. This could be a list of the ECGI of the CSG cells of the HeNB (105). Or, in case all the cells of a CSGID can provide optimization, a CSGID will replace the ECGI List. The cells may be aggregated with more than one CSGID (CSGID List). In certain case, it could be a mixture of the ECGI List and the CSGID list. Some flag in the list can be used to indicate if an entry in the List is ECGI or CSGID. The HeNB (105) can obtain this information directly, e.g. when these cells are provided by the HeNB (105) itself, the HeNB (105) may uniquely determine whether to employ either ECGI or CSGID. Or, it can obtain the information via a server (not depicted in the figure) of the LIA Domain (135).

After creating the necessary entry, as in step 2011, the HeNB (105) replies to the SGW (111) with a Create Default Bearer Response message (2013), with the Optimization Information (OP-INFO) element embedded. The OP-INFO element contains the information provided by the HeNB (105) that can help the UE (101) to detect and optimize the LIA connectivity. Possible information included in the element comprises:

LIA Verification Token. This is the Token generated by the HeNB (105) and saved in its LIA entry;

EPS Bearer ID/IDs. This can also be any identifier generated by the HeNB (105) that can uniquely identify the LIA connection established for the UE (101)'s particular request, i.e. PDN Connectivity Request (2003). This is to support the case that the UE (101) initiates multiple LIA connections to the same HeNB (105), e.g. using different CSGID;

Radio Information of the cells that can provide optimization. For example, this could include the ECGI List, or CSGID List, or a mixture of both, or some additional radio information, e.g. PCI, etc;

Additional Service Related Information corresponds to each of the entry of the above ECGI List or CSGID List. For example, it may indicate that certain cells do not support VoIP application even though it provides access to the same LIA Domain (135). Or, certain cells will provide different QoS level for the LIA. Or, alternatively, certain cells support internee access via the LIA connection. UE can make use of this information to prioritize the cells for LIA or to adjust the service accordingly.

The OP-INFO element can be carried in the message by piggybacking to the existing elements. For example, it can be added to the PCO as additional information sent from the PDN Gateway function to the UE (101). It is obvious to anyone skilled in the art that there could be other methods to carry the OP-INFO element, including inserting a new element into the Create Default Bearer Response message (2013). This does not affect the general principle of the invention, as long as the OP-INFO element can reach the UE (101).

The Create Default Bearer Response message (2015) is forwarded by the SGW (111) to the MME (109) after necessary processing and state establishment. The OP-INFO element is also forwarded in the Create Default Bearer Response message (2015).

After receiving the Create Default Bearer Response (2015), the MME (109) does necessary processing as defined in [2]. MME (109) further creates a Bearer Setup Request message and set towards HeNB (105), as in step 2017. This Bearer Setup Request message (2017) would be forwarded by the HeNB-GW (107) to the HeNB (105) if HeNB-GW (107) exists, as in step 2019.

The OP-INFO element is also embedded in the Bearer Setup Request message (2017, 2019). For example, it can be included as the PCO element of the NAS message PDN Connectivity Accept that is carried in the Bearer Setup Request message (2017, 2019). The MME (109), HeNB-GW (107), and HeNB (105) do not need to understand the information in the OP-INFO element.

After receiving the Bearer Setup Request (2019), the HeNB (105) will configure necessary radio parameters accordingly, as defined in [2]. The HeNB (105) then sends a RRC Connection Reconfiguration message to the UE, as in step 2021. In this RRC message (2021), HeNB (105) embeds the OP-INFO element. For example, the OP-INFO can be placed in the PCO of the NAS PDN Connectivity Accept message that is transparently carried by the RRC Connection Reconfiguration message (2021).

After receiving the RRC Connection Reconfiguration (2021), UE (101) retrieves the OP-INFO element from the embedded NAS PDN Connectivity Accept message. With the OP-INFO information, UE (101) creates an entry for the LIA connection in its local storage, UE-LIA-Entry. If a UE (101) has multiple active LIA connections, it would have multiple entries stored. Each of the UE-LIA-Entries includes some of the following information:

EPS Bearer ID/IDs. This is an identifier that helps UE (101) to track which bearer is used for the LIA. This is useful to distinguish the access to operator's core network and the LIA. Also, it is useful for the case when UE (101) has multiple LIA connections;

LIA Verification Token. This is the Token information obtained from the received OP-INFO element;

Radio Information of the cells. This includes the ECGI List or CSGID List obtained from the received OP-INFO element, and related to the cells as connection targets of the UE (101);

Service Related Information corresponds to each entry of the above ECGI List or CSGID List. This is the information obtained from the received OP-INFO element;

Radio Bearer ID. This is the identifier for the UE (101) to identify the radio connection to the HeNB (105) for the LIA connection. This could be a list of Radio Bearer IDs, if there are multiple radio bearers set up for the same LIA connectivity. The ID can be dynamic and may change every time UE (101) performs a handover or changes Bearer parameters.

The UE (101) will then compare the information of the current serving cell with the Radio Information obtained from the OP-INFO element. For example, it is checked whether the ECGI of the serving cell or the CSG ID is included in the ECGI list or the CSG ID list included in the OP-INFO element. If a UE (101) has multiple LIA connections, i.e. multiple LIA entries stored, it needs to compare the current cell against the ECGI List or CSGID List of all the entries.

If the current CSG cell matches the Radio Information, e.g. the ECGI of the current cell matches one of the ECGI in the ECGI List, or the CSGID of the current CSG cell matches one of the CSGID of the CSGID List, it means that the corresponding LIA Connection for the UE (101) can be optimized. Therefore, UE (101) will send a RRC Connection Reconfiguration Complete message (2025) with an Optimization Information Element (OP-IE). The information contained in the OP-IE can include some of the following elements:

Radio Bearer ID/IDs. This is the radio bearer/bearers that correspond to the LIA connection. This information allows the UE (101) to indicate to HeNB (105) the exact radio bearer to be optimized;

EPS Bearer ID/IDs. This is the identifier for the HeNB (105) to relate the optimization request to the exact LIA connection. It can also be replaced with an identifier that is generated and maintained by the HeNB (105)'s PDN Gateway Function without affecting the general principle of the invention;

LIA Verification Token. This is the token obtained from the received OP-INFO element.

When detected the existence of OP-IE in the RRC Connection Reconfiguration Complete (2025), the HeNB (105) starts the LIA Optimization operation. The HeNB (105) starts with retrieving the LIA entry from its storage using the EPS Bearer ID/IDs of the received OP-IE. The HeNB (105) then verifies the LIA Verification Token of the received OP-IE against that of the stored LIA entry. This could be for example decrypting the Token using the HeNB (105)'s private key and checking if it has the same information as that of the stored value in the LIA entry. This LIA Verification Token is generated per UE per LIA connection, and sent to the UE (101) via the secure NAS channel between MME (109) and the UE (101). This Token helps HeNB (105) to verify if the UE (101) requested LIA connection exists and can be optimized because the UE is connecting the cell provided by the HeNB itself.

When the Token verification is successful, the HeNB (105) will execute the optimization for the LIA connection, i.e. route the traffic from UE (101) for the LIA connection directly into LIA Domain (135) without going through the Operator's Core Network (137). To achieve this, HeNB (105) makes use of the information from both OP-IE received from UE (101) and its stored PGW-LIA-Entry.

For example, the OP-IE from UE (101) in step 2025 contains the Radio Bearer ID/IDs that helps to identify the radio bearers used for the LIA and needs to be optimized. So, for the traffics coming from these bearers, HeNB (105) will not place them into the GTP-U tunnel that goes to the SGW (111). Instead, HeNB (105) retrieves the LIA Domain Pointer from the corresponding PGW-LIA-Entry, and route the traffic into the LIA Domain (135) accordingly. For example, if the traffic is using Internet Protocol (IP) as transport, the LIA Domain Pointer may be a default router address that the HeNB (105) should route the traffic to. Or, the LIA Domain Pointer may be a VLAN tag that HeNB (105) should append to the packet before forwarding into the LIA Domain. Or, the LIA Domain Pointer could be a tunnel ID that points to a tunnel the HeNB (105) should use for transporting the traffic to the LIA Domain. Or, alternatively, the LIA Domain Pointer could be a call number or identifier so that the HeNB calls to the number or the identifier to establish a connection to the LIA Domain, e.g. at remote site.

In the reverse direction, HeNB (105) forwards any traffic that falls into the LIA Filter range to the radio bearers identified by the information from OP-IE, instead of the GTP-U tunnel or PMIP tunnel to the SGW (111).

After the LIA optimization, HeNB (105) will send a Bearer Setup Response (2029, 2031) to the MME (109) via the HeNB-GW (107) if exists. It is obvious to anyone skilled in the art that there may be further signaling involved in the due process, e.g. UE (101) may send a direct NAS message for PDN Connectivity Complete to the MME (109). Whereas, the time and sequence of these additional signaling do not affect the general principle of the present invention.

It is obvious that once the LIA optimization is setup on the HeNB (105), LIA traffic to/from the UE (101) does not go through the ISP (131) domain to the Operator's Core Network (137). The optimization setting may be reverted in certain cases, e.g. one or more of the following conditions are met:

Local policy of the LIA Domain (135) has a period of validity or a time limit for the optimized LIA for the UE (101), e.g. for a guest UE. In this case, a timer will be set when the optimization is first set up. After the expiry of the timer, HeNB (105) will remove the optimization setting, and traffic will be routed per normal, i.e. via the SOW (111). This time limit may also be placed by the Operator's Core Network (137) based on for example UE (101)'s subscription profile or HeNB (105)'s deployment contract. It is obvious that there are various ways to inform the HeNB (105) of the time limit, e.g. via a management interface, embedding some information element in the Create Default Bearer Request from MME (109), set up during HeNB (105)'s registration process to the Operator's Core Network (137), etc, however, this does not affect the general principle of the present invention;

Other conditions include UE (101) lost connection to the HeNB (105);—UE (101) successfully handovered to another cell;—UE (101)'s context is deleted by the Operator's Core Network (137), e.g. MME (109);—UE (101) sends an empty OP-IE in a RRC Connection Reestablishment message.

In the operation presented in FIG. 2, it is assumed that the UE (101) is accessing the CSG Domain (131) via HeNB (105). However, the same operation should apply to scenarios when UE (101) is accessing LIA via another cell, i.e. remote LIA. For example, UE (101) may request to establish the LIA connection in the Macro-cell Domain (133) via eNB (103), or another HNB/HeNB. In this case, the same operation applies, with steps 2001 to 2003 and steps 2019 to 2025 go via the eNB (103) instead of HeNB (105). Also in this case, the step 2023 will result in the UE (101) detects that the current cell is not for LIA optimization. Therefore, UE (101) will not include the OP-IE in the RRC Connection Reconfiguration Complete (2025) message, and thus step 2027 will not be carried out.

Optionally, When the UE (101) finds the LIA connection with path optimization at HeNB, it can modify or request QoS of the connection according to requirements specified for LIA communication, e.g. in general it could be higher throughput, lower delay and so on but other configuration could be applied, so that it is possible for the UE to communicate with the devices in the LIA network with suitable and better configuration according to the communication path, i.e. whether with path optimization or not. The UE (101) may use UE initiated resource modification request procedure as defined in [2]. It is obvious to anyone skilled in the art that there could be other ways for the UE (101) to request for the modification to the network. This does not affect the general principle of the present invention.

Figure 3:
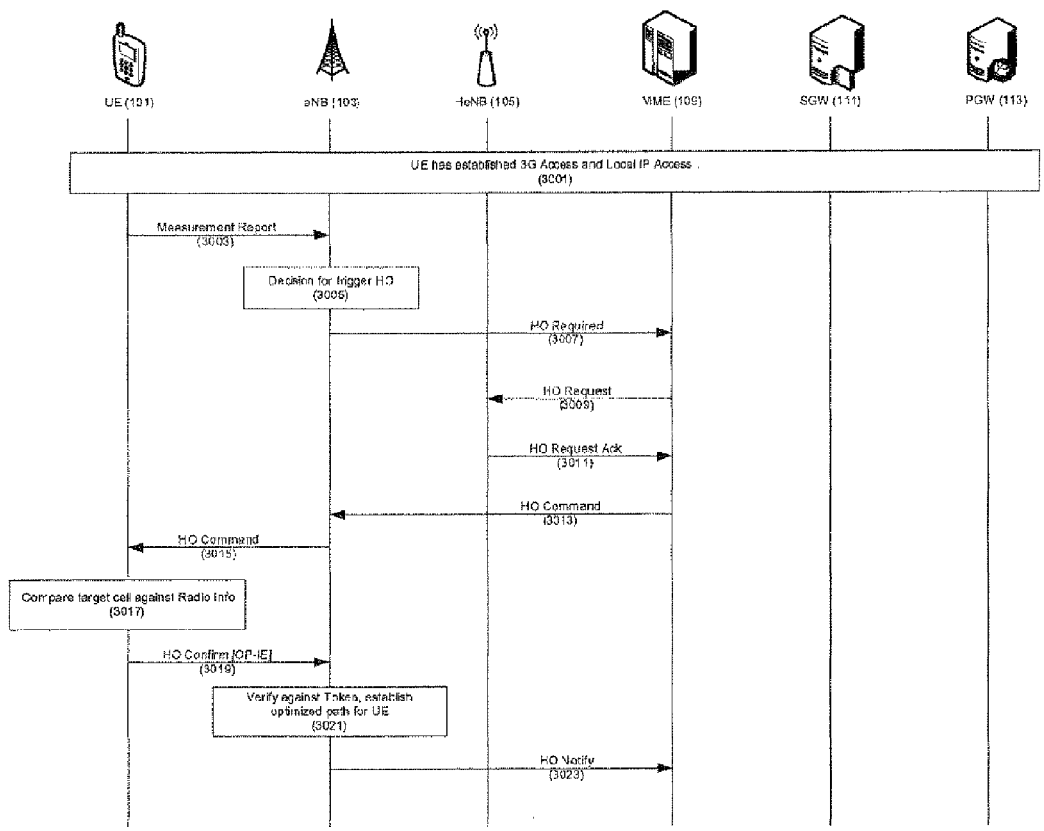
FIG. 3 is an example operation sequence of handing UE over to the CSG Domain.

With reference to FIG. 3, an alternative operation sequence of the present invention is illustrated.

As shown in the figure, UE has already established the access to Operator's Core Network (137) and access to LIA Domain (135) over eNB (103), as in step 3001. These accesses can be setup using the procedure as illustrated in FIG. 2.

Therefore, at this stage, the UE (101) already has the UE-LIA-Entry. At certain point of time, UE (101) sends a Measurement Report (3003) to the serving eNB (103). Since the UE (101) already has the Radio Information of the cells that support LIA optimization, it may choose to prioritize those cells in the Measurement Report, e.g. place in front, or apply certain offset to those cells, etc, so that the UE can keep the LIA connection with better quality on the optimized path. This prioritization can also be based on the service UE (101) is accessing. For example, if the UE-LIA-Entry also indicates the service related information for each of cell, UE (101) can further adjust the priority of the cells, e.g. prioritizing a cell that supports the VoIP applications, etc.

This Measurement Report (3003) together with other information would trigger the eNB (103) to initiate a Handover, as in step 3005. Due to the information reported by the UE (101), the eNB (103) may choose the CSG cell of the HeNB (105) as the target cell. This result in a Handover Required message (3007) being sent towards the MME (109), because it must use S1 based handover procedure as defined in [2]. It is obvious to anyone skilled in the art that the eNB (103) may decide the handover based on other information or triggers than the Measurement Report (3003). MME (109) then sends a Handover Request message (3009) to the HeNB (105).

The HeNB (105) then decides on whether to accept the request based on its own policy and condition. If the UE (101) is to be accepted, the HeNB (105) will send a Handover Request Acknowledge message (3011) back to the MME (109), and MME (109) extracts the corresponding information and form a Handover Command (3013) to the eNB (103). The eNB (103) will forward this Handover Command (3015) to the UE using proper channel, e.g. in a RRC Connection Reconfiguration message as defined in [5].

Once received the RRC Connection Reconfiguration message with the mobility control information, UE (101) will check the target cell's information against the Radio Information of the UE-LIA-Entry. For example, it checks if the target cell's ID is in the ECGI List, or if the CSG ID of the target cell is in the CSGID List.

If the target cell is included in the Radio Information of the UE-LIA-Entry (ECGI list or CSG ID list), UE (101) includes an OP-IE in the Handover Confirm message to the target HeNB (105), as in step 3019, i.e. the RRC Connection Reconfiguration Complete message as defined in [5]. This is similar to that of step 2025.

When the HeNB (105) receives the Handover Confirm message with the OP-IE (3019), it will verify the LIA Verification Token, and start to prepare for the LIA optimization, as in step 3021. This operation is identical to that of step 2027 described earlier. After this step, the LIA connection traffic to/from the UE (101) for the LIA Domain (135) will not go via SGW (111) anymore. The HeNB (105) may send a Handover Notify (3023) to the MME (109) to inform the successful handover.

It is obvious to any skilled in the art that in the sequence described in FIG. 3, it is assuming that the UE (101) handover from a macro-cell eNB (103) to the HeNB (105). This operation also applies to case that the UE (101) handovers from the HeNB (105) to the macro-cell eNB (103). In that case, the step 3017 will result in UE (101) detects that the target cell does not match that indicated by the UE-LIA-Entry. So, UE (101) will not include the OP-IE in the Handover Confirm message, and therefore step 3021 will not be carried out on the target eNB/HeNB.

Figure 4:
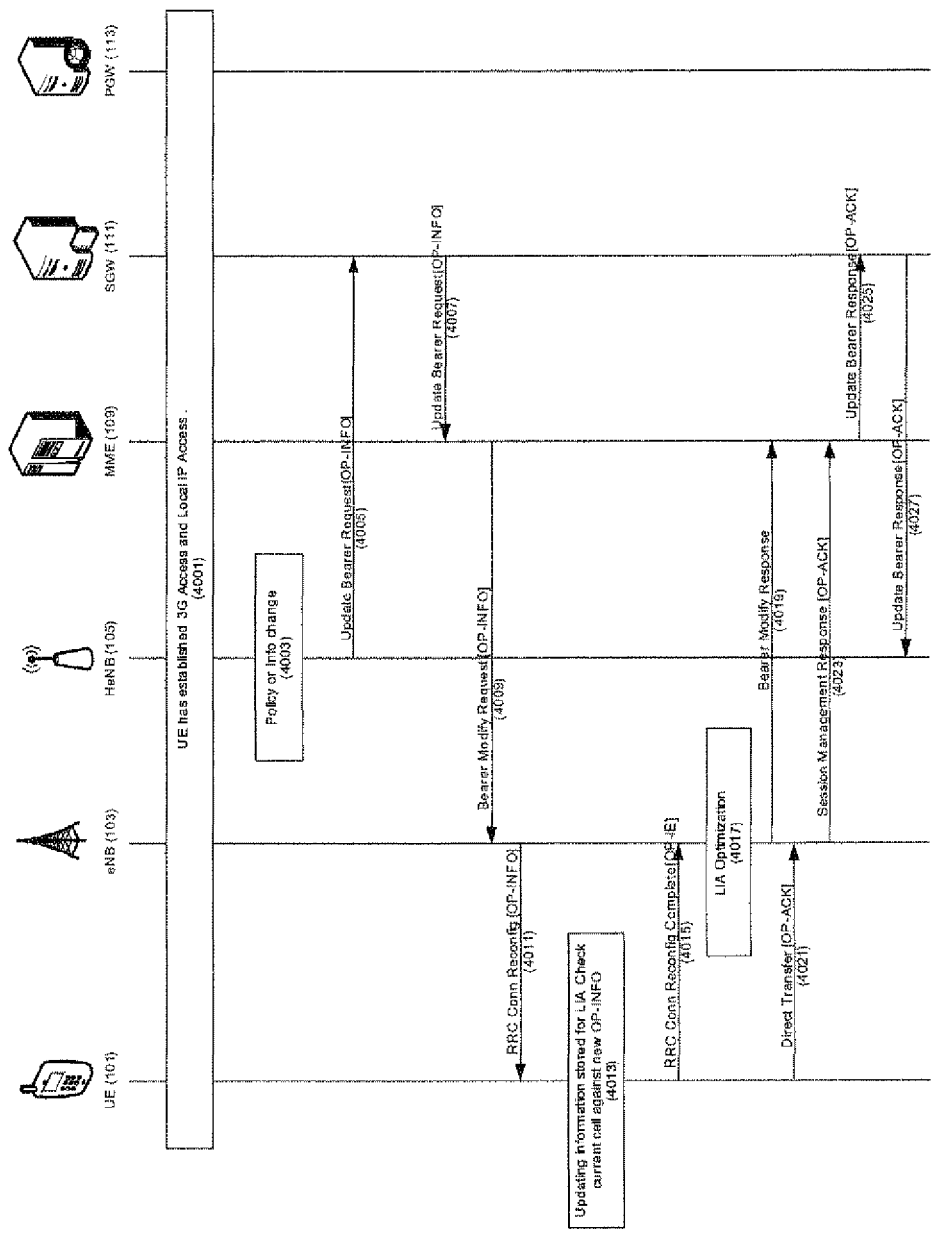
FIG. 4 is an example operation sequence of HeNB updating the optimization information on UE.

With reference to FIG. 4, another alternative operation sequence of the present invention is illustrated. As shown in the figure, UE has already established the access to Operator's Core Network (137) and access to LIA Domain (135) over eNB (103), as in step 4001. These accesses can be setup using the procedure as illustrated in FIG. 2.

At certain point of time, the information of the PGW-LIA-Entry is changed due to certain reasons, e.g. local policy change, radio configuration change, new HeNB added to the network, flow filter update, LIA Domain (135) configuration change, etc.

In this case, the HeNB (105) sends an. Update Bearer Request message (4005) with the updated OP-INFO to the SGW (111). The OP-INFO element is piggybacked to the existing elements of the Update Bearer Request message (4005), e.g. as a special extension to the TFT. It is obvious to anyone skilled in the art that there could be other ways to carry the OP-INFO element, as long as it can reach UE (101). This does not affect the general principle of the present invention.

The Update Bearer Request (4007) is forwarded to the MME (109) by the SGW (111), and it triggers a Bearer Modify Request message (4009) from MME (109) to the UE (101). The OP-INFO element is carried in the NAS message (4009), and is forwarded to the UE (101) by the eNB (103) using a RRC Connection Reconfiguration message, as in 4011. If the bearer modification procedure as defined in [2] is used for implementing the above operation, the OP-INFO element can be embedded in the TFT element of the Session Management Request.

Upon receiving the RRC Connection Reconfiguration message with the new OP-INFO element, UE (101) updates its UE-LIA-Entry with the new information from received OP-INFO, as in step 4013, e.g. the ECGI List, the related service information, etc. At the same time, UE (101) will check the current cell against the new UE-LIA-Entry, and decide if the LIA path should be optimized.

If the current cell matches the information indicated in the new OP-INFO (or the updated UE-LIA entry), it means optimization for the LIA connection is possible. UE (101) then sends a RRC Connection Configuration Complete message (4015) to the eNB (103) with an OP-IE included. Upon receiving this RRC message (4015) with the OP-IE, eNB (103) verifies the Token and prepares for LIA optimization, as in step 4017. The step 4015 and 4017 is identical to that of 2025 and 2027.

The eNB (103) will send a Bearer Modify Response (4019) back to MME (109) to inform the result of the execution of the procedure.

Optionally, UE (101) will send a NAS message (4021, 4023) to the MME (109) via eNB (103). In this NAS message, UE (101) can indicate an optional acknowledgement, OP-ACK, for the UE-LIA-Entry update. This OP-ACK element will be forwarded by the MME (109) to the HeNB (105) via SGW (111) in the Update Bearer Response message (4025, 4027).

In the above embodiment, processing performed by the MME to acquire or derive a contact address of the PGW from the subscription information on the specified APN or the UE is described, it may be configured such that an HeNB subsystem (HeNB 105 or HeNB-GW 107) provides the contact address of the PGW or a corresponding identifier to the MME 109 through step 2003, for example. In this case, an S1-AP message can be used to forward the PDN Connectivity Request to the MME 109, and the address of the PGW providing the CSG ID and the LIA service can also be piggybacked in the S1-AP message. The MME 109 uses information acquired from the HeNB subsystem to perform PGW selection processing (PGW Selection). When the MME acquires the identifier of the PGW from the HeNB subsystem, a name conversion mechanism such as DNS is used to derive the contact address.

It may also be configured such that cells accessible to the LIA and an identifier of the HeNB, e.g., the ECGI of the HeNB, HeNB ID, CSG ID, or the like, are registered in the subscription of the UE 101. Based on these pieces of information, the MME 109 derives the address of the PGW for the LIA service. For example, when registration is performed for the MME 109 after startup of the HeNB 105, the contact address (corresponding to the PGW address) for the LIA service and the HeNB ID or the ECGI may be registered together. This enables the MME 109 to search a HeNB registration database to acquire address information capable of providing the LIA access in a cell containing the UE 101 when the UE 101 requests the LIA access.

Through steps S2017 and S2019, the MME 109 may also provide additional information based on the access control results to the HeNB 105. For example, information on service limitations such as to allow the current connection (LIA connection) to be handed over to another cell, a QoS parameter such as to give lower priority to the current connection than that to the PDN connection to a core network (e.g., EPC: Evolved Packet Core), or vice versa, etc. are provided from the MME 109 to the HeNB 105. The HeNB 105 can use such additional information to determine a location (e.g., cell) to establish the connection. In other words, it is determined whether handover will be performed from now on, whether rate control will be performed upon an under resourced condition, etc. As a result, the LIA connection can be established without affecting the PDN connection to the core network.

The HeNB 105 (the above PGW equivalent function) may perform individual Bearer generation processing (e.g., Dedicated Bearer Activation Procedure) shown in Non-patent Document 2 at the same timing as the transmission of the Create Bearer Response message in step S2013. This is performed when the HeNB 105 has determined that special QoS settings are necessary for the LIA connection. In this case, the OP-INFO element or the OP-IE element and associated processing as described in the embodiment can be applied to the resulting signaling and processing at each device to obtain the same effects. In other words, the path-optimized LIA connection can be realized for a newly generated individual Bearer, so that the UE can enjoy the optimized LIA connection in a special environment with an individually set QoS, leading to improvement in user convenience.

Further, although the handover processing using the S1 interface is described with reference to FIG. 3, if a handover procedure using X2 interface as disclosed in Non-patent Document 2 is performed, messages are directly exchanged between the eNB 103 and the HeNB 105. Further, no interaction exists between the eNB 103 (or the HeNB 105) and the UE 101 as shown in steps S3015 and S3019. Therefore, if the processing according to the present application as discussed above is performed, information as mentioned above in steps S3015 and S3019 in an area update (Tracking Area Update or Location/Routing Area Update) procedure as disclosed in Non-patent Document 2, which is performed after completion of the handover processing, may be exchanged (e.g., information as mentioned in step S3015 is notified to the UE 101 using a Tracking Area Update Accept message or Routing Area Update Accept message, or information s mentioned in step S3019 is notified from the UE 101 using a Tracking Area Update Complete message or Routing Area Update Complete message), so that the UE 101 will perform the processing in step 3017 using the information thus notified.

Embodiment 2

Figure 5:
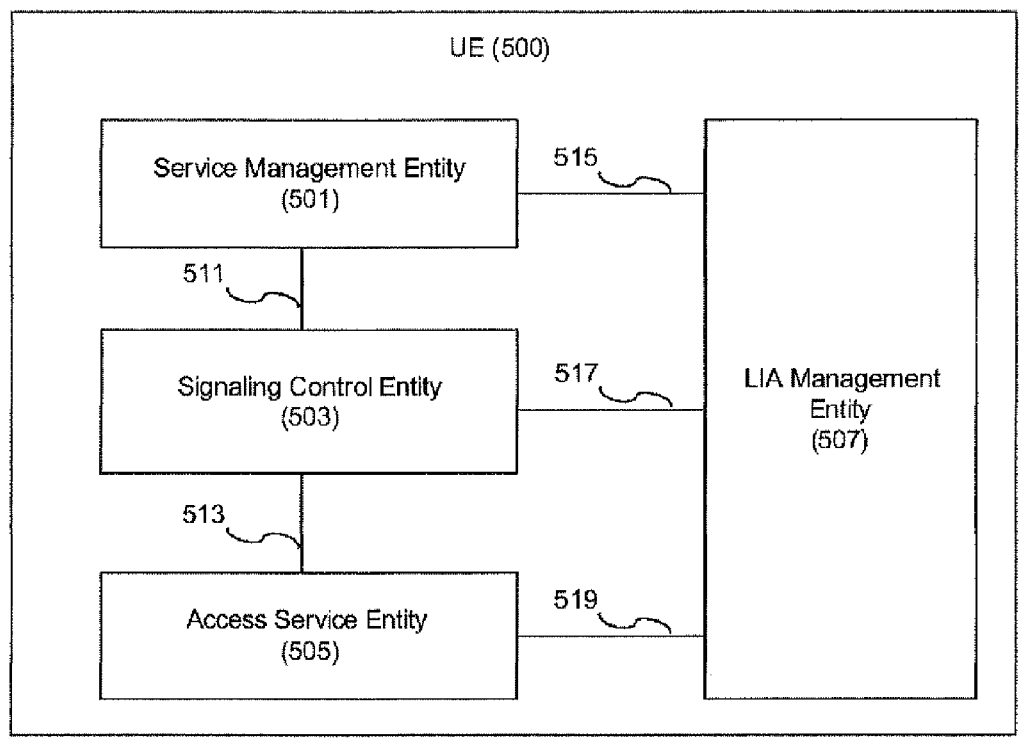
FIG. 5 is an example architecture of the UE that supports the present invention.

With reference to FIG. 5, a possible architecture of the UE (500) that implements the present invention is illustrated. The UE (500) has four major function blocks, namely, Service Management Entity (501), Signaling Control Entity (503), Access Service Entity (505), and LIA Management Entity (507). Among them, the Service Management Entity (SME) (501) is in charge of initiating and maintaining the service on the EU (500). It for example has the capability to interact with the user, and has access to some stored preference and profiles.

The Signaling Control Entity (SCE) (503) is in charge of signaling with the Operator's Core Network (137) entities, e.g. MME (109). The SME (501) informs SCE (503) of the necessary connection and QoS for supporting the active or new services via interface 511. The SCE (503) will inform the connection setup results to the SME (501) via interface 511.

The Access Service Entity (ASE) (505) is in charge of establishing connection to the eNB (103) or HeNB (105). It sends and receives the RRC messages. SCE (503) provides necessary parameters to the ASE (505) for the connection management via interface 513. ASE (505) also passes the NAS messages to the SCE (503) via interface 513.

For example, in a terminal that supports 3GPP LTE access, the SME (501) corresponds to the application layer and terminal management function, the SCE (503) corresponds to the NAS Layer, and the ASE (505) corresponds to the RRC layer.

The LIA Management Entity (LME) (507) is in charge of managing the Local IP Access, e.g. creating and maintaining the UE-LIA-Entry, checking the cell information against UE-LIA-Entry, creating the OP-IE, etc. The LME (507) obtains the OP-INFO element from SCE (503) via interface 517, and sends the OP-IE element to the ASE (505) via interface 519. The LME (507) obtains application related information from SME (501) via interface 515, and instruct the ASE (505) on cell prioritization via interface 519.

An example instance of the UE-LIA-Entry is as following:
EPS-Bearer-ID-1
LIA-Verification-Token-1;
ECGI-List-1:
ECGI-1:
Service-Information-1;
Radio-Bearer-Information-1;
Radio-Bearer-Information-2;
ECGI-2:
Service-Information-2;
Radio-Bearer-Information-3;
CSGID-List-1:
CSGID-1:
Service-Information-3;
Radio-Bearer-Information-4;
EPS-Bearer-ID-2
LIA-Verification-Token-2;
ECGI-List-2:
ECGI-3:
Service-Information-4;
Radio-Bearer-Information-5;
Radio-Bearer-Information-6;

Every time, a new OP-INFO element is received, the LME (507) will obtain the corresponding EPS-Bearer-ID, and search the UE-LIA-Entry. If there is an existing sub-entry for the specific EPS-Bearer-ID, LME (507) will update the related information according to the received OP-INFO element. If no such EPS-Bearer-ID sub-entry exists in the UE-LIA-Entry, LME (507) creates a new sub-entry and stores the corresponding information obtained from OP-INFO element.

Whenever there is a change of cell information or the UE-LIA-Entry, the LME (507) will go through each ECGI-List and CSGID-List of the sub-entries and compare them the current cell or target cell information. If there is a match, LME (507) will form retrieve corresponding information from the sub-entry and form an OP-IE element and pass to ASE (505).

The LME (507) also can obtain the application preference from the SME (501), and check the UE-LIA-Entry accordingly. For example, if the UE (500) has VoIP application, LME (507) would try to prioritize those ECGIs or CSGIDs that has Service-Information indicating supporting VoIP. The LME (507) can then inform the ASE (505) about this prioritization and corresponding ECGI or CSGID list. This way, ASE (505) can prioritize these cells in the measurement reports by using some offsets.

It is obvious to anyone skilled in the art that the UE-LIA-Entry above is just an example logic structure. In real implementation, other structure could be utilized to simplify the operation. For example, all the ECGI-List and CSGID-List can be stored and combined, with each entry associated with a pointer to the data structure that stores the other information. This way, the LME (507) only needs to search through one central list for detecting the LIA optimization opportunities.

Figure 6:
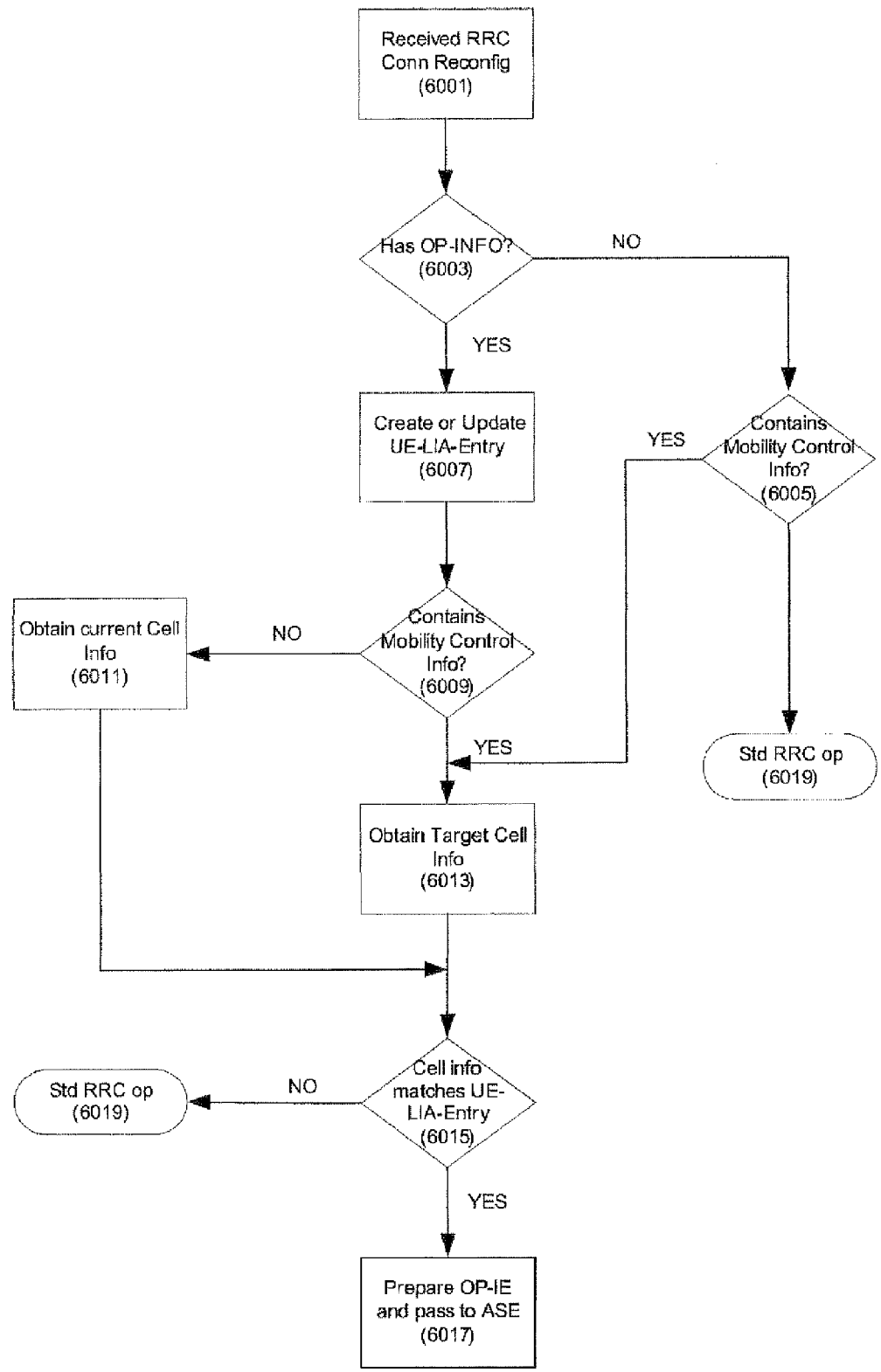
FIG. 6 is an example message processing logic of UE.

With reference to FIG. 6, and example logic for the UE (500) to process a received RRC Connection Reconfiguration message is illustrated.

As shown in the figure, when UE receives a RRC Connection Reconfiguration message (6001), it will first check if it contains an OP-INFO element, as in step 6003. The UE (101) may receive the RRC Connection Reconfiguration as a result of operation step 2021 of FIG. 2, step 3015 of FIG. 3, or step 4011 of FIG. 4. If there is no OP-INFO element exists, UE will check if there is mobility control information element in the message, as in step 6005. If there is no mobility control information element, normal RRC operation as defined in [5] is carried out, as in step 6019, and corresponding RRC Connection Reconfiguration Complete message will be prepared and sent to eNB or HeNB without any OP-IE element. If there is mobility control information element in the message, it means this is a handover operation, and UE (500) will go to 6013.

If at step 6003, the message contains an OP-INFO element, the element is passed to LME (507), and LME (507) will check the UE-LIA-Entry and decide if to update corresponding sub-entry or create a new sub-entry or create a new UE-LIA-Entry, as indicated in step 6007.

The UE (500) will then check if the RRC Connection Reconfiguration message contains any mobility control information, i.e. whether it is a Handover Command, as in step 6009. If there is no such mobility control information, UE will try to obtain the current serving cell information, e.g. ECGI, CSG ID, etc, as in step 6011.

If there is a mobility control information element in the message, it means that it is a handover operation. The UE (500) then tries to obtain the target cell information, e.g. ECGI, CSGID, etc, as in step 6013.

After step 6011 or 6013, LME (507) will try to compare the cell information inst that of the UE-LIA-Entry, as in step 6015. If the cell information matches any of the ECGI-List or CSGID-List, the LME (507) will prepare a corresponding OP-IE, and pass it to ASE (505) to be included into the RRC Connection Reconfiguration Complete message, as in step 6017.

Embodiment 3

Figure 7:
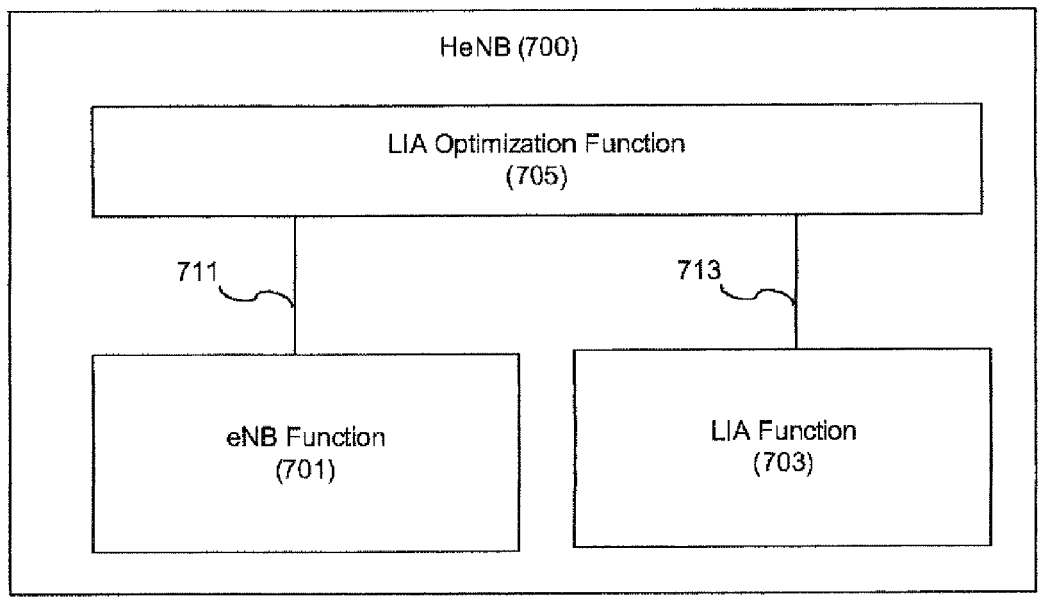
FIG. 7 is an example architecture of the HeNB that supports the present invention.

With reference to FIG. 7, an example architecture for the HeNB (700) that implements the present invention is illustrated. As shown in the figure, there are three major elements in the HeNB (700), namely, eNB Function (eNF) (701), Local IP Access Function (LAF) (703), LIA Optimization Function (LOF) (705).

The eNF (701) implements the Home eNodeB function as defined in [2] and [3]. The LAF (703) implements a subset of the PDN GW function as defined in [2] that can provides the Local IP Access to the UE (101).

The LOF (705) checks and process the OP-IE element that is received by the eNF (701), and optimize the Local IP Access as described earlier. The LOF (705) is also in charge of creating and maintaining the PGW-LIA-Entry.

An example instance of the PGW-LIA-Entry is as following:
  EPS-Bearer-ID-1:
  LIA-Verification-Token-1;
  LIA-Domain-Pointer-1;
  LIA-Filter-1;
  LIA-Access-Configuration;
  LIA-Access-QoS;
  ECGI-List:
  ECGI-1:
  Service-Information-1;
  ECGI-2:
  Service-Information-2;
  CSGID-List:
  CSGID-1:
  Service-Information-3;
  CSGID-2:
  Service-Information-4;
  EPS-Bearer-ID-2:
  LIA-Verification-Token-2;
  LIA-Domain-Pointer-2;
  LIA-Filter-2;
  LIA-Access-Configuration;
  LIA-Access-QoS;
  ECGI-List:
  ECGI-3:
  Service-Information-5;

When eNF (701) receives a RRC Connection Reconfiguration Complete message, it checks for the OP-IE element. The OP-IE element will be passed to the LOF (705) via interface 711. Upon receiving the OP-IE, LOF (705) checks the PGW-LIA-Entry and look for the sub-entry that matches the EPS-Bearer-ID of the received OP-IE. If such an entry is found, the LOF (705) will verify the LIA-Verification-Token of the received OP-IE against that of the PGW-LIA-Entry sub-entry. If the Token matches, LOF (705) will initiate the LIA optimization process. The LIA optimization can be achieved by linking the radio bearer that is indicated by the OP-IE and the LIA connection to the LIA Domain (135) indicated by the LIA-Domain-Pointer and LIA-Filter.

A parameter LIA-Access-Configuration is used by the HeNB 700 to determine the PDN connection operations. The value is set by the MME 109 in step S2019, for example. Use of the parameter enables a notification whether handover from the PDN connection used for the LIA connection to another cell is allowed. As an example of another cell, another CSG cell having the same CSG ID, another CSG cell having a different CSG ID, or a macro cell can be cited. This enables the HeNB 700 to determine its behavior (handover or the like) for appropriate mobile control.

A parameter LIA-Access-QoS is also set by the MME 109, e.g., in step S2019 together with the LIA-Access-Configuration. The parameter can specify settings and behavior in terms of the QoS of the corresponding PDN connection for the LIA connection to another PDN connection (e.g., PDN connection for core network EPC connection). For example, it can be so instructed that the PDN connection for the LIA connection does not interfere with the PDN connection for the EPC connection or affect the QoS. In response to this, the HeNB 700 performs rate control on the PDN connection for the LIA connection so that it can behave to ensure that sufficient resources are distributed to the PDN connection for EPC connection and hence the QoS is guaranteed. Such an instruction may be applied between multiple UEs. For example, a higher priority than that of the PDN connection for the LIA connection of a specific UE may be given to the PDN connection for EPC connection of another UE, thus contributing to the maintenance and management of resources in the entire system.

Figure 8:
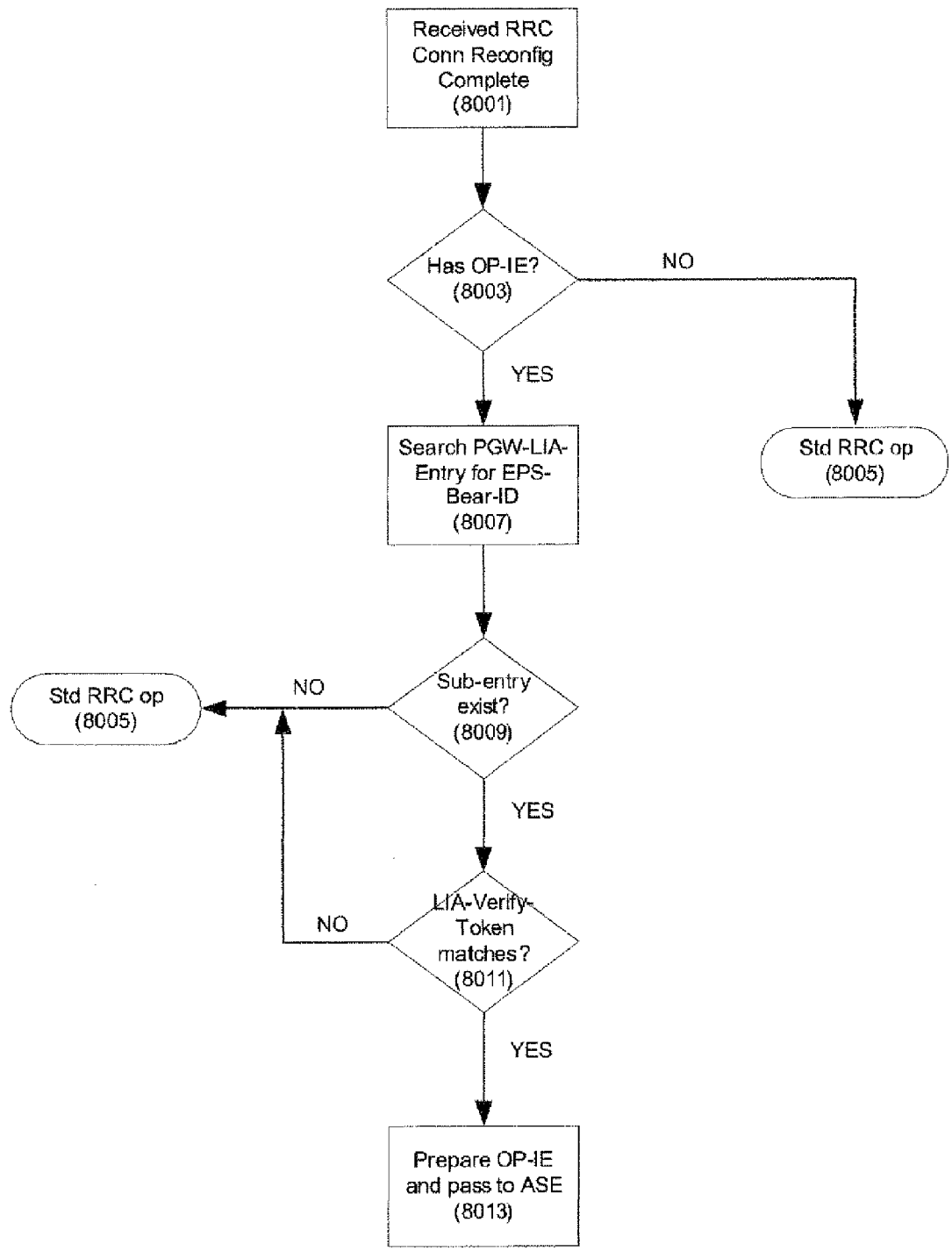
FIG. 8 is an example message processing logic of HeNB.

With reference to FIG. 8, and example logic of the HeNB (700) used for processing the RRC Connection Reconfiguration. Complete message.

As shown in the figure, when a RRC Connection Reconfiguration Complete message is received by eNF (701), as in step 8001, the HeNB (700) checks if there is any OP-IE element in the message, as in step 8003. The HeNB (105) may receive the RRC Connection Reconfiguration Complete message as the result of operation shown in FIGS. 2 to 4, e.g. step 2025 of FIG. 2, step 3019 of step 3, or step 4015 of FIG. 4. If there is no OP-IE element, standard RRC operation as defined in [5] will be carried out, as indicated by step 8005.

If at step 8003, there is OP-IE find in the message, the OP-IE is passed to the LOF (705) via interface 711, and LOF (705) will search the PGW-LIA-Entry for the sub-entry that contains the EPS-Bearer-ID indicated in the OP-IE, as in step 8007.

LOF (705) will check if such sub-entry exists in the PGW-LIA-Entry, as in step 8009. If there is no such entry, LOF (705) will ignore this OP-IE, and allow the eNF (701) to carry out standard RRC operation as defined in [5], as indicated in step 8005.

If such sub-entry is found in PGW-LIA-Entry, the LOF (705) will verify the LIA-Verification-Token of the received OP-IE against that of the found sub-entry of the PGW-LIA-Entry, as in step 8011.

If the Tokens does not match, LOF (705) silently ignores the OP-IE, and allows the eNF (701) to carry out standard RRC operation as defined in [5], as in step 8005.

If the Tokens matches, the LOF (705) will initiates the LIA optimization operation, as indicated in step 8013, using the information provided by OP-IE and the found sub-entry of the PGW-LIA-Entry.

Embodiment 4

Figure 9:
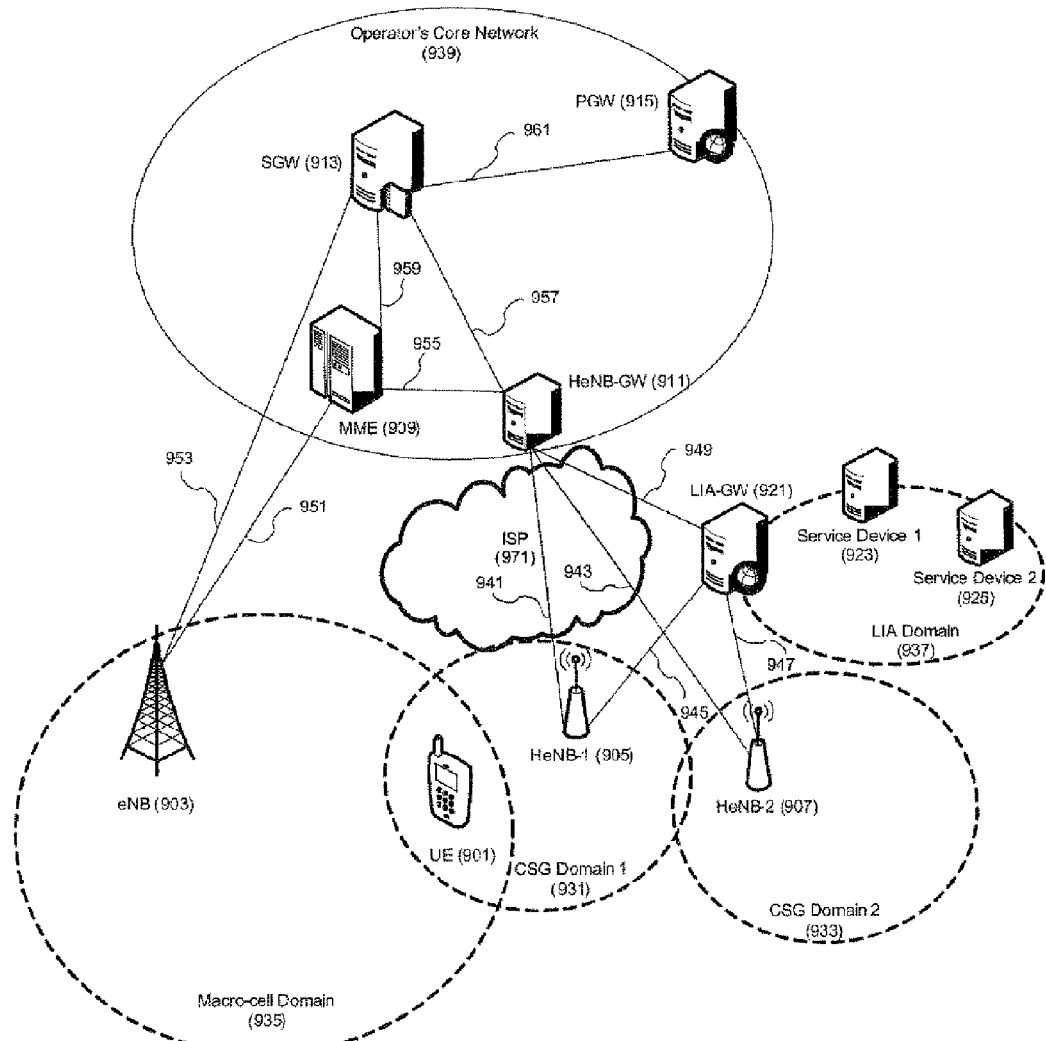
FIG. 9 is an alternative network architecture that supports the present invention.

With reference to FIG. 9, an alternative network configuration that the present invention can apply to is illustrated. As shown in the figure, there are multiple HeNBs, e.g. HeNB-1 (905) and HeNB-2 (907), that can provide optimized access to the LIA Domain (937). The HeNB-1 (905) and HeNB-2 (907) are connected to the Operator's Core Network (939) via an ISP (971) domain. The HeNB-1 (905) and HeNB-2 (907) are connected to the LIA Domain (937) via a LIA Gateway (LIA-GW) (921).

The Operator's Core Network (939) and Macro-cell Domain (935) architecture are identical to that of shown in FIG. 1. For example, the eNB (903) connects to the MME (909) and SGW (913) via interface 951 and 953 respectively. When an HeNB-GW (910 is placed, the HeNBs are connected to the Operator's Core Network (939) via the HeNB-GW (911). The HeNB-GW could be the LIA-GW.

There are multiple devices that provide service to UE (901), e.g. Service Device 1 (923), and Service Device 2 (925). There can be limitations for different devices that can be used in the different CSG Domains. For example, in CSG Domain 2 (933), UE (901) may be allowed to access both devices, and in CSG Domain 1 (931), UE (901) can only be allowed to access Service Device 1 (923).

This network architecture is very useful for a corporate network deployment. For example, a corporate network may deploy multiple HeNBs directly connected to their private resources, e.g. printer, email server, file server, general Internet connectivity. One of the HeNB may act as the master, and the rest act as the slaves. The master HeNB will also provide the LIA to the LIA Domain (937), i.e. the master HeNB acts as the LIA-GW (921) as well.

In order to access these different services, a UE (901) needs to initiate multiple LIA connections, with each correspond to a particular service. In this case, the LIA-GW (921) will serve as the PDN Gateway for these connections, i.e. MME (909) will resolve the APN to LIA-GW (921) address. The LIA-GW may act as a gateway between the LIA Domain network and the PGW in the HeNB, i.e. MME will resolve the APN to the PGW in a certain HeNB.

The different HeNBs are operating in different mode with different restrictions. For example, HeNB-1 (905) is operating in hybrid mode, and only allows UE (901) to access general Internet via the LIA connections. HeNB-2 (907) operating in the close mode, and allows UE (901) to access printer, email server, etc, in the corporate network.

The operations introduced in FIGS. 2, 3, and 4 can still apply to this network architecture. The only difference is that the operations involving the HeNB (105) in step 2007 to 2013, and step 4003 to 4005, are now carried out by the LIA-GW (921).

Therefore, when UE (901) initiates the setup of LIA Connection, the LIA-GW (921) will return such information about the services in the OP-INFO element in step 2013. For example it can be:

ECGI-1:
Internet.LIA.mnc012.mcc345.gprs;
ECGI-2:
Internet.LIA.mnc012.mcc345.gprs;
email.LIA.mnc012.mcc345.gprs;
ftp.LIA.mnc012.mcc345.gprs;

Once received this information in the OP-INFO, the UE (901) can decide the preference of the HeNB, and if a service should be suspended. For example, if the UE (901) has an existing connection for the email service, it should not use HeNB-1 (905) indicated by ECGI-1. The LME (507) of the UE (901) should inform the ASE (505) to avoid that cell.

Here, it is obvious to anyone skilled in the art that the LIA domain 135 or 937 can be the general Internet, part of a corporate network, or the corporate network itself. In this case, the home device 121, the service device 1 (923), and the service device 2 (925) can be replaced with any devices to be connected to the Internet or the corporate network without departing from the scope of the invention.

Embodiment 5

It is obvious that with the present invention, the traffic for LIA connection to/from the UE (101, 901) can be optimized i.e. goes to the LIA Domain (937) without going through the ISP. However, this only applies to the user plane traffic. For control plane signaling, the message still goes through the SGW (111, 913) in the Operator's Core Network (137, 939). Therefore, legacy support of the present invention is good.

It is also obvious that the present invention only requires additional operation on nodes that support the invention. For example, if a HeNB does not implement the present invention, it would ignore the OP-REQ element, and nothing will be done, and thus the UE (101) will also not perform additional operation. And, the HeNB also would not perform any additional operation if the UE (101) does not indicate the OP-REQ, i.e. no additional operation if the UE is a legacy UE. This way, it has minimum impact to the legacy devices, and would save UE batteries because the UE doesn't have to perform additional operation unnecessarily.

Embodiment 6

In certain cases, the Home Device or Service Device (121, 923, 925) may wish to initiate the LIA connection towards the UE. This should be achievable by sending a packet to the HeNB (105) or LIA-GW (921). The HeNB (105) or LIA-GW (921), before forwarding it into the SGW (111, 913), can initiate some local paging messages that are sent via the cells indicated in the OP-INFO, i.e. the ECGI-List and CSGID-List. This way, larger scale paging in the macro-cell can be avoided, if UE (101, 931) are in the CSG cells.

Figure 10:
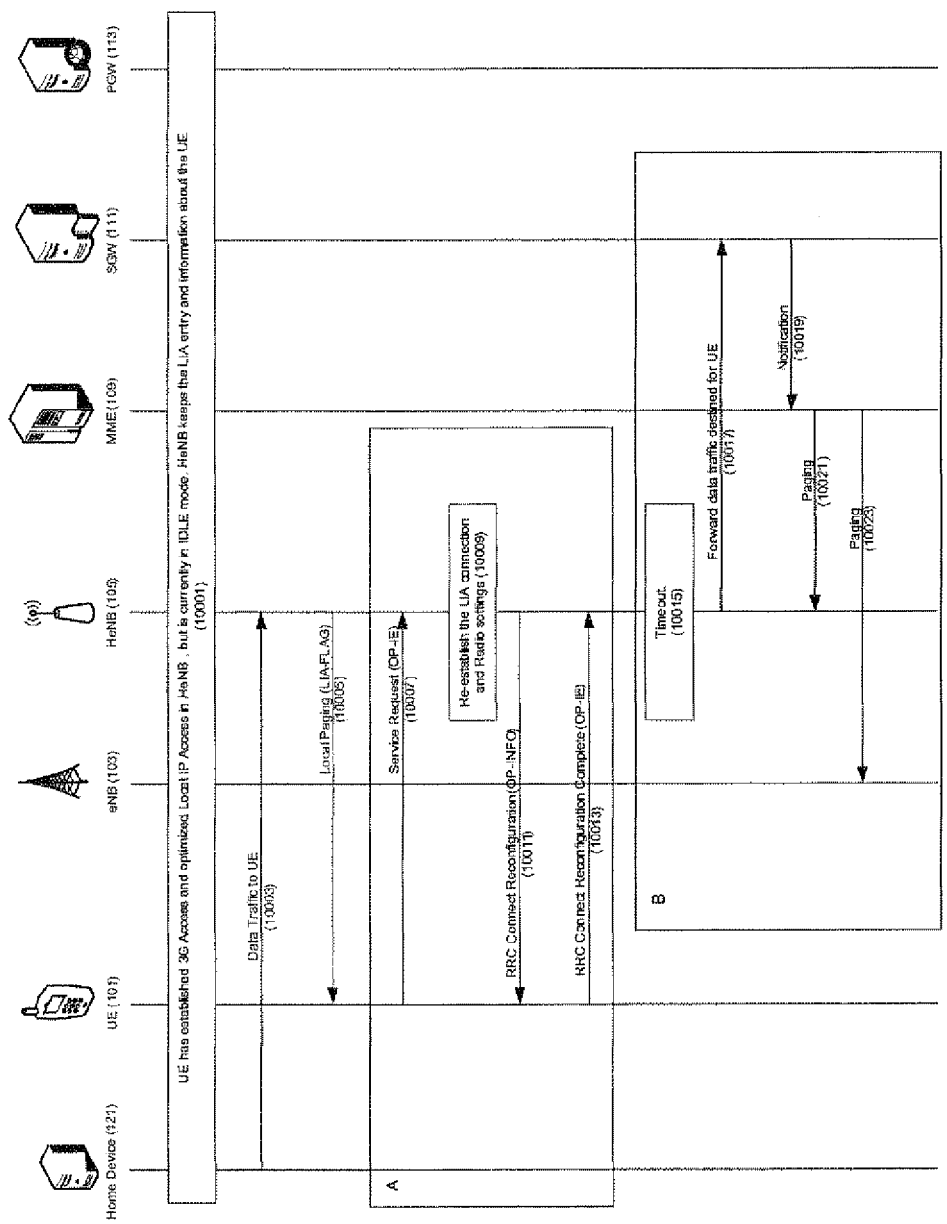
FIG. 10 is an example operation sequence of paging the UE inside the CSG Domain.

With reference to FIG. 10, an example operation sequence is illustrated. As shown in the figure, UE has already established connection to operator's core network and an optimized Local IP Access on the HeNB, as in step 10001. This could be a result of the operation as illustrated in FIG. 2, 3, or 4. However, after such a state that the UE 101 has not performed communication for a certain period of time, UE (101) enters IDLE mode, as indicated by 10001. This may be a result from a long UE inactivity, for example. In this case, the radio bearer for the UE (101) indicated in the OP-IE earlier as in procedure of FIG. 2, 3, or 4, is no longer existing on HeNB (105).

At certain point of time, a Home Device (121) in the LIA Domain (135) will try to contact the UE, by sending some data traffic to the UE address, as indicated by 10003. This traffic will be intercepted by the HeNB (105).

Once received this data, and realized that the radio bearer for the UE (101)'s LIA connection is no longer available, the HeNB (105) would send a Local Paging, as indicated by 10005. In this Local Paging message, 10005, HeNB (105) indicates that this is for the LIA connection by using a LIA-FLAG that is understandable by the UE. This LIA-FLAG can be a pre-set value that is configured on the UE, or a special code that is announced by the HeNB (105) in the OP-INFO element, or broadcast in the system information element.

Once received this Local Paging, 10005, UE will respond with a Service Request, 10007. In the Service Request message, 10007, UE (101) includes the OP-IE element as defined earlier for the operation in FIG. 2, 3, or 4. In this OP-IE, the UE (101) may obviate the radio bearer information, e.g. the Radio Bearer ID/IDs. This is because the new radio bearers need to be reconfigured by the HeNB (105).

When HeNB (105) received this Service Request message with the OP-IE, 10007, it will try to re-establish the LIA Connection and also the relevant radio setting for the UE (101), as in step 10009. This includes for example retrieving the corresponding sub-entries of the HeNB-LIA-Entry, setting radio bearer information for the UE, etc.

The HeNB (105) will then send a RRC Connection Reconfiguration message, as in 10011, with the OP-INFO element to the UE (101). And UE will respond with a RRC Connection Reconfiguration Complete message, as in 10013, with the OP-IE element. This is similar to that of the operation of FIG. 2, 3, or 4.

After the operation shown in the block A, i.e. step 10007 to 10013, the connection between the UE (101) and the Home Device (121) is established, and they can communicate directly via the HeNB (105) using the optimized LIA connections.

However, the UE (101) may move out of the HeNB (105) coverage during the IDLE mode period. The alternative operation covering this is shown in block marked B. If operation in block A is carried out, i.e. HeNB (105) received the Service Request (10007), these operations in block B should be skipped.

As shown in the figure, if the HeNB (105) did not receive the Service Request (10007) before a per-set timer times out, as in 10015, the HeNB (105) would forward the traffic from Home Device (121) to the SGW (111) of the UE (101), as in step 10017. The timer value could be a local HeNB (105)

setting, or could be managed by the operator through the HeNB (105) management interface. The SGW (111) is the SGW (111) that is selected for the UE (101) as in procedures illustrated in FIG. 2, 3, or 4.

When the SGW (111) received the data, it will try to send a notification to the MME (109), as in step 10019. This will in turn trigger the MME (109) to send paging request to all the cells in the TAI List that is configured to the UE (101), as in 10021 and 10023. These steps, 10019 to 10023 are standard operation procedures as defined in [2].

The advantage of this operation is that if the UE is still under the HeNB (105) coverage, only the HeNB (105) needs to send paging message, as in operation illustrated in block A. No core network element or macro-cells need to be involved. It reduces the paging load of the operator's core network, and thus can help in reducing core network load and also avoid unnecessarily wake up other UEs in the macro-cell to listen for the paging message.

If the influence of conventional non-local paging applied to a UE in a macro cell is acceptable, the conventional paging method may be applied instead of local paging. In other words, when receiving traffic for the UE (step S10003), the HeNB 105 forwards the traffic for the UE to the SGW 111 without performing the processing from step S10005 to step S10015 (step S10017). This can reduce the time required for incoming calls when the UE 101 is not under control of the HeNB 105.

Further, in FIG. 10, when the home device 121 brings out data traffic for the UE 101 (step S10003), if the UE 101 does not have the PDN connection for LIA, the PDN connection for LIA to the UE 101 may be established in a way different from that mentioned above. For example, an IP address (static IP address, which is also called a static IP prefix) scheduled by the HeNB 105 (PGW function thereon) to be assigned to the UE 101 or predetermined to be assigned to the UE 101, and identification information on the UE 101 in a 3GPP network (e.g., subscriber identifier IMSI, local subscriber identifier TMSI, GUTI, terminal identification number IMEI, telephone number, etc.) are prestored in the form of a pair. Then, upon receiving traffic from the home device 121, if confirming that the PDN connection for LIA to the UE 101 is not established, the HeNB 105 derives an identifier of the UE 101 in the 3GPP network from the traffic directed IP address to start establishing the PDN connection for the LIA connection based on the derived identifier.

For example, when the HeNB 105 (PGW function thereon) sends a PDN connection establishment request including identification information of the UE 101 to a subscriber information management node HSS (not shown) in the 3GPP core network, the HSS identifies the UE 101 from the identification information, acquires current base information on the UE 101, and starts establishing the PDN connection for LIA to the UE 101 (or just instructs the UE 101 to establish the connection so that the establishment of the actual PDN connection will be started by the UE 101). Here, the establishment of the PDN connection may be started by any PGW (including the PGW function on the HeNB 105) based on the instruction from the HSS, or by the MME 109 based on the instruction.

Alternatively, an identifier to instruct the establishment of the PDN connection for LIA may be included in a paging message to the UE 101. Upon receipt, the UE 101 starts establishing the PDN connection for LIA following (or at the same time as) Service Request processing started in response to the paging message. Specifically, the PDN connection for LIA is established according to the procedure described in the embodiment 1. Further, when the UE 101 can determine that an IP packet received through the PDN connection established by the Service Request processing is from the home device 121 in the LIA network, the establishment of the PDN connection for LIA may be started immediately.

Alternatively, the HeNB 105 may establish a call connection through a telephone number of the UE to instruct the establishment of the PDN connection for LIA, or notify the user visually or aurally to start the establishment of the PDN connection for LIA using the UE 101 (the user may be notified in such a manner to play certain music from the HeNB 105, blink an indicator on a body of the HeNB 105, or display images using the home device 121 such as a TV or CD player).

Thus, even if the UE 101 has not establish the PDN connection for LIA, the HeNB 105 causes the UE 101 to establish a new PDN connection for LIA so that incoming information from the home device such as the TV or audio can be received successfully, enabling improvement in user convenience.

The pair of the IP address of the UE 101 and the identifier in the 3GPP network are managed in a information structure such as a table, and upon registration of the UE 101 with the HeNB 105 (including an application for contract), these pieces of information may be collected and stored in the HeNB 105, or the UE 101 may collect these pieces of information when connecting to the HeNB 105 and store them in the HeNB 105, or the user may instruct the storage of the information in the HeNB 105 using a user interface on the UE 101 or the HeNB 105.

Embodiment 7

In this embodiment, a path optimization method when the UE tries to connect to the LIA network in such a structure that the HeNB and the LIA network are remotely connected through a connection such as a telephone line or VPN will be described with reference to FIG. 11 through FIG. 13.

Figure 11:
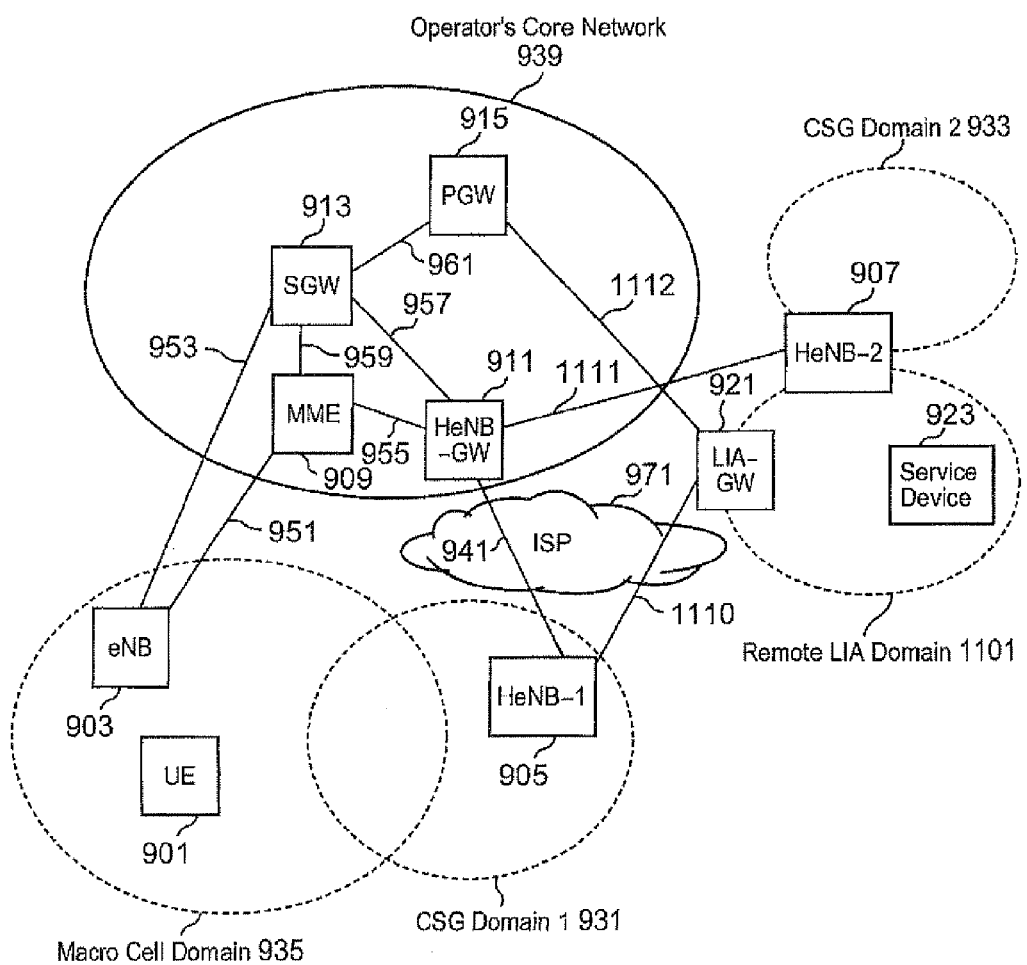
FIG. 11 is an example another network architecture that supports the present invention.

FIG. 11 is a diagram showing an example of a system configuration according to the present invention. As shown in FIG. 11, a HeNB 905 is attached to a remote LIA domain 1101 through a LIA-GW 921 or the like. This connection may be made through an ISP 971, or through another network such as a telephone line. The HeNB 905 is also connected to an operator's core network 939. If the connection is made through a HeNB-GW 911 (interface 941) or no HeNB-GW is placed depending on the network structure, the connection can be made directly through an SGW 913 or an MME 909 and an interface, not shown.

The rest of the basic structure, such as the structure of the operator's core network 939 and a macro cell domain 935, is the same as that shown in FIG. 9, and the description thereof will be omitted. Points different from FIG. 9 are that a CSG domain 2 933 is remotely connected to the remote LIA domain 1101 and located remotely with respect to a CSG domain 1 931, and the LIA-GW 921 can have an connection interface 1112 to a PGW 915 in the operator's core network 939.

A LIA connection method from the macro cell domain 935 of the UE 901 in the system thus configured such above will be described with reference to FIG. 12. FIG. 12 is a diagram showing an example of a sequence of operations for performing path optimization to the remote LIA network in the system according to the present invention.

The UE 901 starts access from the macro cell domain 935 through an eNB 903 to the remote LIA domain 1101 connected to the HeNB-1 905. In FIG. 12, it is assumed that the UE 901 has already established a connection to the 3G core network (step S1201). A flow from step S1203 to step S1207 is similar to that from step S2003 to step S2007 shown in FIG. 2, except that the identifier of the LIA domain the UE 901 is going to access is included in an OP-REQ element. In this case, a PDN Connectivity Request message including the OP-REQ accompanied with the identifier of the remote LIA domain 1101 is sent. The identifier of the LIA domain may be, for example, a network prefix or a sub-net address, a value uniquely determined by an administrator administrating the LIA domain or an operator, a unique value determined globally, or an address or the like of a specific device installed in the LIA domain.

The HeNB-1 (905) that has received a Create Bearer Request message via the SOW 913 first checks the local policy for establishing LIA (step S1209). This policy can show with what limitation LIA is to be provided. For example, a band limitation in each session, limitations on the duration of allowing a guest user to access and related charge, and the like are shown. When the remote LIA is allowed, other service limitations, such as the priority of each session (what type of session is given priority, i.e., LIA from a CSG domain is given priority over the remote LIA, or vice versa), are defined.

The HeNB-1 (905) also checks the presence of a PGW or HeNB as a further optimum destination by referring to the LIA domain identifier included in the OP-REQ element. When detecting the presence of the further optimum. PGW or HeNB, the HeNB-1 (905) extracts its identifier (host name, APN, or the like) or address, includes it in an OP-REQ element, and sends the SGW 913 a Create Bearer Response message including the OP-REQ element (step S1213). At this time, a code indicative of a processing error or a code for notifying a change of destination may be added to the Create Bearer Response message. The SGW 913 forwards the Create Bearer Response message to the MME 909 (step S1215).

The HeNB-1 (905) may pre-store, inside the node, the presence of the PGW or HeNB as the further optimum destination, or cheek with an external server or the like every time. The external server may be, for example, the HeNB-GW 911, a given HeNB (HeNB-2 or the like), the LIA-GW 921, the MME 909, or an HSS, not shown.

When extracting the address or identifier of the PGW or HeNB as a new destination from the OP-REQ element in the Create Bearer Response message, the MME 909 resends the Create Bearer Request message to the destination notified (step S1217). When the identifier as the new destination is included in the OP-REQ element, the MME 909 derives an address by means of DNS or the like, and sets the address for a Create Bearer Request message. The Create Bearer Request message is delivered to the new destination (here, HeNB-2 (907)) via the SGW 913 (step S1219).

Here, the MME 909 may search for the PGW or HeNB as the optimum destination instead of the processing performed by the HeNB-1 (905) in step S1209. In this case, the MME 909 sends the Create Bearer Request message directly to the optimum PGW or HeNB (here, HeNB-2 (907)) without sending it to the HeNB-1 (905) via the SGW 913 (steps S1205 to S1207) (i.e., step S1217 is executed instead of step S1205).

When the new destination is a PGW (e.g., PGW 915), the Create Bearer Request message (step S1219) sent by the SGW 913 is delivered to the PGW 915 so that the PGW 915 will establish the PDN connection for the remote LIA domain 1101 on behalf of the UE 901 using a standard procedure described in Non-patent Document 2. This corresponds to the operation when the remote LIA domain 1101 is connected as a PDN (Packet Data Network) via the PGW 915, the LIA-GW 921, and the like in FIG. 11. Here, a device that enables the remote LIA domain 1101 to connect to a node, such as the PGW 915, in the core network 939 may be a common gateway instead of the LIA-GW 921. In other words, the gateway to the PGW 915 (operator's core network 939) may be shared with the LIA connection, or installed individually.

Further, the HeNB-1 (905) may forward the Create Bearer Request message directly to the optimum PGW or HeNB.

When receiving the Create Bearer Request message, the HeNB-2 (907) checks a connection according to the local policy in the same manner as the HeNB-1 (905) (step S1221). If checked as being connectable, the same processing as in step S2011 and steps that follow in FIG. 2 is performed in step S1223 and steps that follow to perform optimum processing for LIA connection. Subsequent processing is the same as that described with reference to FIG. 2, and the description thereof will be omitted here. However, note that in this embodiment, since the UE 901 tries to establish a connection from the macro cell, cell information does not match in step S1233. Therefore, an OP-IE element is not inserted in an RRC Connection Reconfigure Complete message, and the processing according to this embodiment is not performed at a macro eNB 903.

Through the above-mentioned operations, the UE 901 can establish a connection to the target remote LIA domain 1101 via the optimum PGW or HeNB.

In the above embodiment, the identifier of the LIA domain (remote LIA domain 1101) the UE 901 desires to attach to is included in the PDN Connectivity Request message, but the optimum destination may be searched for by any other method. For example, the UE 901 sends a PDN Connectivity Request message without including the identifier to establish a LIA connection to attach to the remote LIA domain 1101 via the HeNB-1 (905) to start communication with a node, e.g., a server device 923, in the remote LIA domain 1101. After starting the communication, when the HeNB-1 (905) detects that the UE 901 is communicating with the remote LIA domain 1101, the HeNB-1 (905) notifies the UE 901 of an address or identifier of a more suitable connection point (PGW or HeNB).

The UE sends a PDN Connectivity Request message for establishing a new LIA connection through the address of the connection point notified (in case of the identifier notified, the address may be derived by checking with the server), or starts handover processing on the connection point notified. The new connection point (POW 915 or HeNB-2 (907)) may acquire a connection context of the UE 901 from the HeNB-1 (905) so that the IP address assigned to the UE 901 up to that time can be used continuously.

If detected that the UE 901 is also communicating with another local LIA domain (LIA domain directly connected to the HeNB-1 (905)), the UE 901 or the optimum destination (PGW or HeNB) may be requested to establish a new LIA connection. This enables the UE 901 to establish LIA connections for both the local LIA domain and the remote LIA domain. Alternatively, the HeNB-1 (905) may intentionally disconnect the LIA connection to urge the UE 901 to reconnect so that the UE 901 will establish LIA connections for both the local LIA domain and the remote LIA domain, respectively. This enables the UE 901 to establish the optimum LIA connections for both the local LIA domain and the remote LIA domain to perform optimized communication.

Figure 12:
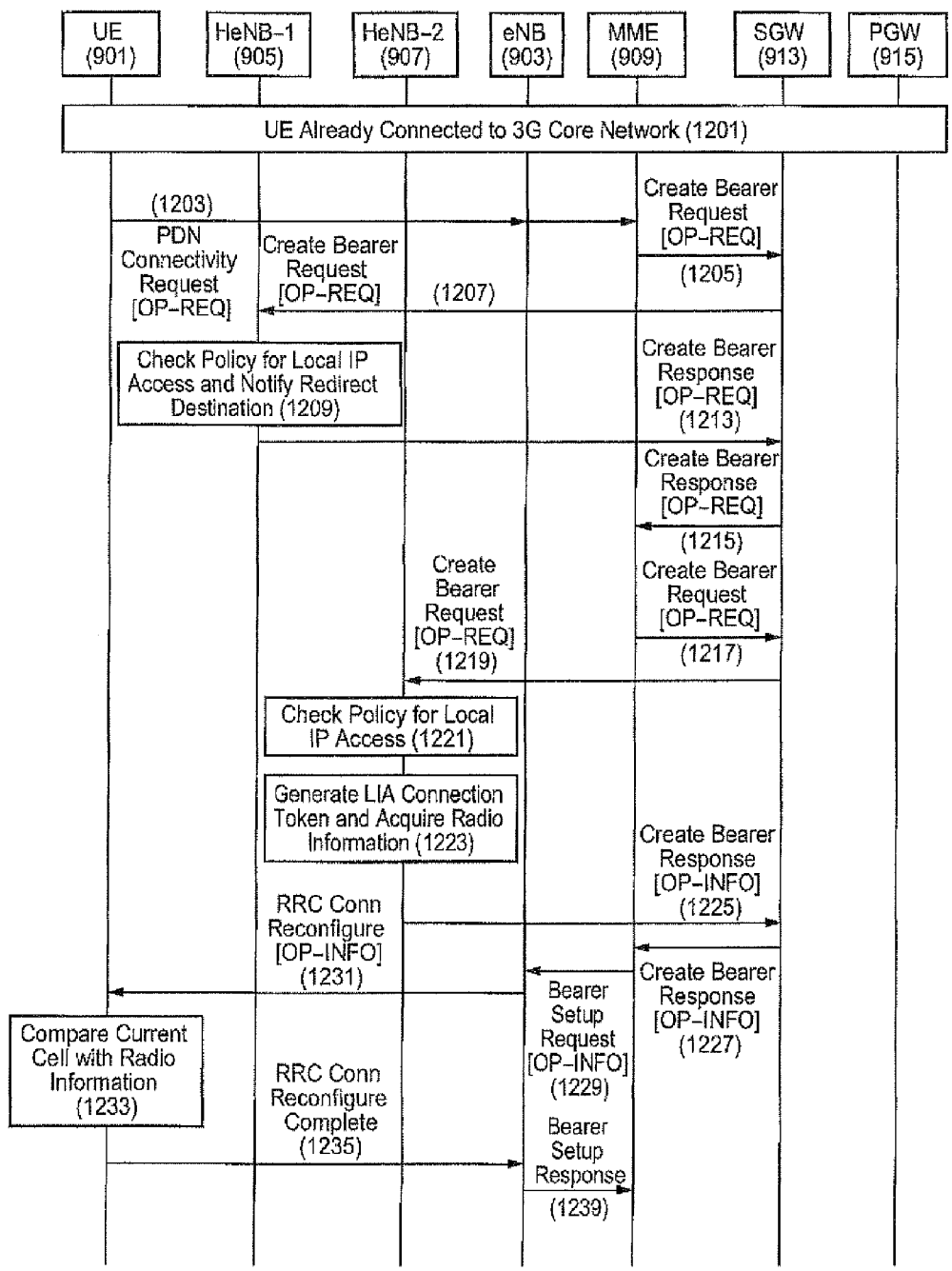
FIG. 12 is an example of a sequence of operations for performing path optimization to a remote LIA network in the system according to the present invention.

The above has described the method of establishing the LIA connection based on the address or identifier of the PGW or HeNB as the optimum destination extracted by the HeNB-1 (905) or the MME 909 in FIG. 12. Here, especially when the identifier is not an APN, the MME 909 may derive the address by means of DNS or the like, or an APN as a new destination may be notified to the UE 901 through a PDN Connectivity Response message, not shown, or the like. Upon receipt, the UE 901 sends a PDN Connectivity Request message for the APN notified (or attachment processing is performed again). When the MME 909 derives the address from the APN notified and performs subsequent connection processing, the UE 901 is notified of the APN through a signal (e.g., in a RRC Connection Reconfigure message) to notify the UE 901 of the completion of connection.

Figure 13:
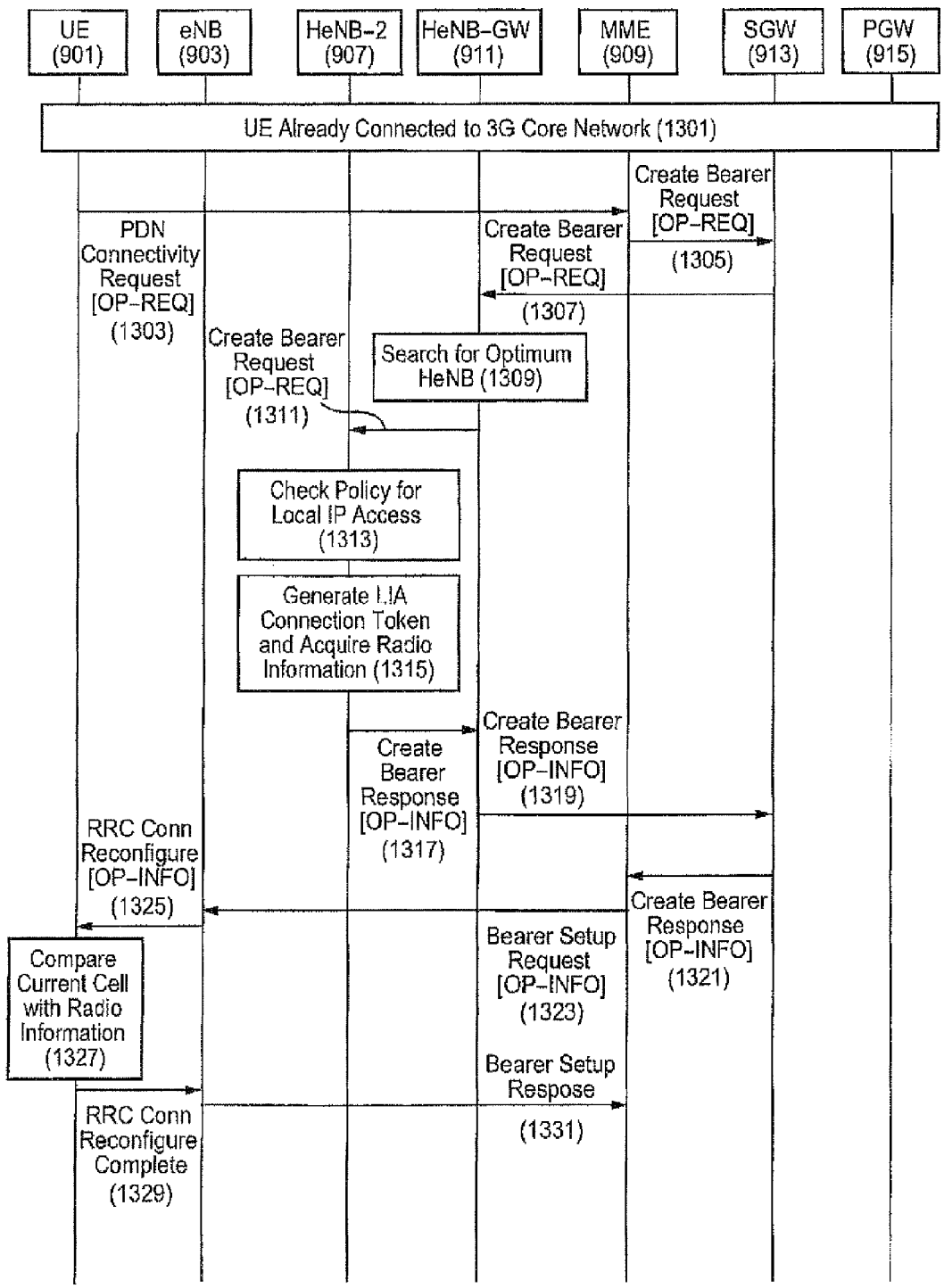
FIG. 13 is an another example of the sequence of operations for performing path optimization to the remote LIA network in the system according to the present invention.

Referring next to FIG. 13, a different LIA connection method from the macro cell domain 935 of the UE 901 in the system whose structure is shown in FIG. 11 will be described. FIG. 13 is a diagram showing a different example of the sequence of operations for performing path optimization to the remote LIA network in the system according to the present invention.

Processing shown in FIG. 13 is almost the same as that shown in FIG. 12. A point different from FIG. 12 is that the extraction of a redirection destination performed by the HeNB-1 (905) is performed by a HeNB-GW 911 in FIG. 13. In other words, the Create Bearer Request message resulting from the PDN Connectivity Request message (step S1303) sent by the UE 901 is acquired by the HeNB-GW 911 from the MME 909 via the SGW 913 (steps S1305 to S1307) to search for the optimum HeNB by referring to the identifier of the destination LIA domain included in the OP-REQ element at the HeNB-GW 911 (step S1309).

As a result, the Create Bearer Request message is delivered to the extracted HeNB (here, the HeNB-2 (907)) (step S1311). Subsequent processing is the same as that described with reference to FIG. 12, and the description thereof will be omitted. Thus, since the HeNB-GW 911 searches for a HeNB suitable as a whole, a mechanism for determining a redirection destination for each individual HeNB is no longer required, enabling reductions in costs for and processing load of the HeNB. Further, since the selection of a HeNB can be made transparently to the core network, processing specific to existing core network equipment and its load can be reduced.

If a suitable HeNB cannot be found among those under control, the HeNB-GW 911 may check with an adjacent or given HeNB-GW or a certain server to forward the Create Bearer Request message to an HeNB-GW having a suitable HeNB. Thus, a HeNB suitable for a wide area can be found, enabling improvement in user convenience for the optimized LIA connection.

Further, when the HeNB-GW 911 finds a HeNB, which is suitable but different from that desired by the UE 901, the UE 901 may be notified explicitly thereof so that the UE 901 will make clear its intention to connect. This results in connection to the destination intended by the user, and hence trouble with fees, QoS, and the like can be prevented. Upon the notification to the UE 901, fees, QoS, and the like may also be notified so that the user can establish a LIA connection to a new destination notified without anxiety, leading to improvement in user experience.

Further, when the HeNB-GW 911 finds an appropriate HeNB, the address or identifier (e.g., APN) of the extracted HeNB may be notified to the MME 909 via the SGW 913 or the SGW 913 without delivering the Create Bearer Request message to the extracted HeNB. The MME 909 that has received the notification changes the APN previously specified by the UE 901 in the PDN Connectivity Request message to the APN notified from the HeNB-GW 911 to start the connection processing again in the middle of the processing (e.g., a new Create Bearer Request is sent to the SGW 913). When the SGW 913 receives the notification, the destination APN is replaced by the APN notified, and the PGW address is replaced by a POW address derived from the APN notified, and a Create Bearer Request message is sent toward the new destination (here, HeNB-2 (907)).

Further, when the UE 901 tries to establish the LIA connection via the HeNB-1 (905) using a DSMIP (Dual Stack Mobile IP) protocol, the HeNB-1 (905) or the HeNB-GW 911 may notify the UE 901 of a new address of the PGW or HeNB (PGW thereon) based on the procedure described above. Since the UE 901 is notified of the above address during DSMIP bootstrap processing, DSMIP bootstrap is run again for the notified address to perform key exchange processing for establishing a DSMIP tunnel to the optimum PGW or HeNB notified and processing for acquiring a home address or home prefix.

According to the embodiment, the UE 901 can establish a LIA connection to a remote LIA domain via a more suitable gateway (PGW or PGW equivalent function on HeNB), so that not only can path optimization be realized, but also the load on the HeNB to attach remotely to the remote LIA domain can be reduced, thereby improving the quality of service in the LIA connection. Further, a communication connection through a 3G core network can be established without using a telephone line or VPN connection to ensure QoS or communication quality over the entire LIA connection.

In the embodiment, the UE 101 accesses LIA from the macro cell domain 935 is described. However, in case of accessing from the CSG domain 931, the optimized path can also be established in the same manner upon connection to the remote LIA domain 1101.

At this time, in the structure as shown in FIG. 9, when the UE 901 is located in a position where the coverage of the HeNB-1 (905) intersects with the coverage of the HeNB-2 (907), and tries to establish a connection to the remote LIA domain 1101 via the HeNB-1 (905), a case is considered where HeNB-2 (907) is notified as the optimum HeNB. In this case, it is desired that a notification (e.g., PDN Connectivity Response message) including the CSG ID of the HeNB-2 (907) be issued to the UE 901.

This causes the UE 901 to disconnect a current RAN (Radio Area Network) connection to the HeNB-1 (905) to establish a new connection to the HeNB-2 (907) detected based on the notified CSG ID by the above-mentioned method according to the present invention. Alternatively, HeNB-1 (905) may disconnect the current connection to request a connection to the HeNB-2 (907) at the same time without issuing such a notification to include the CSG ID like the PDN Connectivity Response message from the HeNB-1 (905) to the UE 901. At this time, the HeNB-1 (905) may notify the UE 901 of a cell ID such as CSG ID or ECGI as the identifier of the HeNB-2 (907). Upon receipt, the UE 901 starts establishing a connection to the HeNB-2 (907).

Here, the notification from the HeNB-1 (905) to the UE 901 may be a handover command to the HeNB-2 (907), or may be to instruct the UE 901 to disconnect a current connection of the MME 909 instead of the HeNB-1 (905) or to switch over to the HeNB-2 (907). When the MME 909 instructs the UE 901 to disconnect the connection, the identifier (CSG ID, ECGI, or the like) of the HeNB-2 (907) is included in an instruction message. This enables the UE 901 to start a new connection to the HeNB-2 (907) after the disconnection.

Thus, the UE 901 can attach to a desired LIA domain 937 (corresponding to the remote LIA domain 1101 in FIG. 11) via the HeNB-2 (907) capable of providing a further optimum path. This enables the UE 901 to establish a LIA connection under the optimum QoS condition.

Embodiment 8

In addition to the aforementioned embodiments 1 to 7, in such a structure that an HeNB contains one or more relay nodes (RNs), when an RN establishes a connection for signaling and for data plane necessary to accommodate the UE, a PGW on the HeNB can be selected. In other words, the RN establishes a PDN connection by specifying an APN corresponding to the PGW on the HeNB. Here, the PDN connection for the RN becomes a LIA connection through the HeNB, so that data over the PDN connection remains in the LIA domain (a special LIA domain for RN connection may be prepared to distinguish it from a normal LIA connection) provided by the HeNB without passing through the core network, enabling a reduction of network loads, especially the load on the core network (i.e., device loads and total network load).

After that, when the RN accommodates the UE, the RN exchanges signaling messages with a node (MME, SGW, PGW, or the like) in the core network through the previously established PDN connection for the RN to establish a PDN connection for the UE. Then, when the UE establishes a LIA connection through the RN and the HeNB, UE is attached to a PGW on the HeNB. This can realize a connection to a UE's core network or LIA through the RN while reducing influence on the core network, enabling a reduction of the load on the total network.

Further, as described in the embodiment 7, when the UE 901 is requested to change the connection from the HeNB-1 (905) to the HeNB-2 (907), the HeNB-1 (905) functions as an RN so that the UE 901 can establish a connection to the remote LIA domain 1101 via the HeNB-2 (907) capable of providing the optimum connection while maintaining the connection to the HeNB-1 (905). Here, the HeNB-1 (905) functioning as the RN establishes a PDN connection for the RN to the HeNB-2 (907) (PGW thereon), and the UE 901 also establishes the LIA connection via the PGW on the HeNB-2 (907) through the RN.

Thus, the UE 901 can establish the optimum LIA connection via the HeNB-2 (907) while using radio resources established with the HeNB-1 (905). In the conventional, since the radio resources previously established with the HeNB-1 (905) are discarded at the time of switching to the HeNB-2 (907) and radio resources are newly secured for the HeNB-2 (907), the embodiment has the advantages over the conventional in terms of improvement in radio use efficiency and reduction in processing for establishing radio resources.

Embodiment 9

In the aforementioned embodiments 1 to 8, the example of using the HeNB and EPS architecture for LTE is described. However, it is obvious to anyone skilled in the art that the present invention can be implemented almost the same way in any other architecture, such as HNB (Home NodeB) and GPRS (General Packet Radio Service) architecture, HNB and UMTS (Universal Mobile Telecommunications System) architecture, or HeNB and GPRS or UMTS architecture.

For example, In a configuration based on the HNB and GPRS architecture, an SGSN (Serving GPRS Support Node) assumes the roles of the MME and SGW as mentioned above in performing corresponding processing. Similarly, a GGSN (Gateway GPRS Support Node) assumes the role of the PGW in performing corresponding processing. A PDP context ID is used as a substitute for the EPS bearer ID used to describe the aforementioned embodiments 1 to 8. Some messages may be different slightly in terms of their descriptions, signaling procedures, the order of messages, or the like, but it is not a matter of implementation according to the present invention.

Embodiment 10

In the aforementioned embodiments 1 to 9, when receiving the Create Bearer Response message, the MME 109 performs processing disclosed in Non-patent Document 2 to send a Bearer Setup Request message to the HeNB 105. At this time, the MME 109 may forward the acquired ECGI list (and/or CSG ID list) and a LIA confirmation token directly to the HeNB 105 (i.e., they are not forwarded to the UE). In the process of performing Attach Request, Service Request, and Tracking Area Update Procedures, the MME 109 can know the cell ID (ECGI) or CSG ID of the HeNB 105 currently connected to the UE 101. Therefore, the MME 109 compares it with the acquired ECGI list (and/or CSG ID list) through a Create Bearer Response message, and if there is a match, the MME 109 determines it to be a HeNB capable of establishing an optimized path for LIA connection. As a result, the MME 109 forwards the LIA confirmation token in a Bearer Setup Request message to cause the HeNB 105 to establish the optimized path for LIA connection. The HeNB 105 evaluates the LIA confirmation token, confirms that it is correct, and establishes the optimized path for LIA connection. In other words, a path to LIA-GW is set. Therefore, even an unmodified UE can achieve the LIA connection through the optimized path, enabling improvement in user convenience.

In the embodiment, when the HeNB or LIA-GW stores, in a Create Default Bearer Response message, information (ECGI list or LIA confirmation token, and the like, i.e., information as described in the embodiment 1) as a feature of the present invention, it is stored in a field acquirable and determinable by the MME 109 (e.g., an exclusive field provided in the message) instead of the PCO as shown in the embodiment 1. Further, to meet the requirements for subsequent mobility management processing and the like for the UE 101, the MME 109 stores the acquired ECGI list (and/or CSG ID list) and the LIA confirmation token in a UE context (e.g., Mobility Management Context: MM Context). Then, when performing processing for the UE 101, i.e., handover processing, location update processing (Tracking Area Update, or the like), or recovery processing from the idle mode (Service Request Procedure or Tracking Area Update Procedure with Active flag), the cell IDs (and/or CSG IDs) of base stations (including HeNB) to be camped on by or connected to the UE 101 with the stored ECGI list (and/or CSG ID list), and if there is a match, the LIA confirmation token is forwarded to a target base station (HeNB).

Update processing for the ECGI (and/or CSG ID) list and the LIA confirmation token can also be performed in the same procedure as that shown in the aforementioned embodiments in such a manner that the MME acquires an updated list distributed from the HeNB or LIA-GW and updates the UE context.

The MME may determine which of the notification of the LIA confirmation token by the MME as shown in the embodiment and the notification of the LIA confirmation token by the UE as shown in the embodiment 1 is to be performed. For example, a flag indicating that UE can perform processing according to the present invention is notified to the MME. In this ease, when the MME determines that the notification of the LIA confirmation token by the UE to be performed and notifies the LIA-GW of it, the LIA-GW stores the cell ID and the LIA confirmation token in the PCO and forwards it to the UE. On the other hand, if the UE does not support the processing according to the present invention, i.e., when the predetermined flag is not notified (or when a flag indicating that it is unsupported is notified), the MME notifies the LIA-GW of it, and the LIA-GW forwards the information to the MME using one Create Bearer Response message without storing the cell ID and the LIA confirmation token in the PCO.

The flag indicative of the support situation of the UE for the processing according to the present invention may be stored in the PCO and notified directly to the LIA-GW. In such a case, the LIA-GW checks the support situation, and if it is supported, stores predetermined information in the PCO and forwards it to the UE. If not supported, the LIA-GW forwards the predetermined information to the MME as described in the embodiment.

Embodiment 11

In a certain service or application, extended services can be provided by selecting a local network as destination or an LGW in adapting to the location of the user (UE), or changing the service content provided, the capability of the system network, the guaranteed QoS content, the security level, etc. For example, in a corporate information system, an employee who accesses a corporate network from an external access system may be restricted not to access files or data at high security levels in terms of information protection and prevention of information leakage. On the other hand, when accessing from an in-company access system, the employee is permitted to access secret data or files within the scope of authority obtained as a result of user authentication. Specifically, a higher security level is imposed on an employee who makes remote access to a corporate network (local network) from a location other than in-company base stations (e.g., corporate CSG cells), or the employee is required to connect to an exclusive local network for remote access, thus avoiding information leakage.

In the embodiment, an adaptive service-providing method will be described, in which the UE tries a LIA connection from a base station (e.g., H(e)NB: HNB or HeNB) directly connectable to the local network (LIA network) (i.e., capable of establishing an optimized path with the local network) or an area or network including such a base station, or the access is remote access (Remote IP Access: RIA connection) from any other base station (e.g., from a macro base station such as eNB) or from an area or network including such a base station, or the service content provided from the local network, access level, capability of the system network, guaranteed QoS content, security level, or LGW for accessing the local network or the local network itself is changed depending on the type of access network, base station, or cell as the source upon connecting to the local network.

Figure 14:
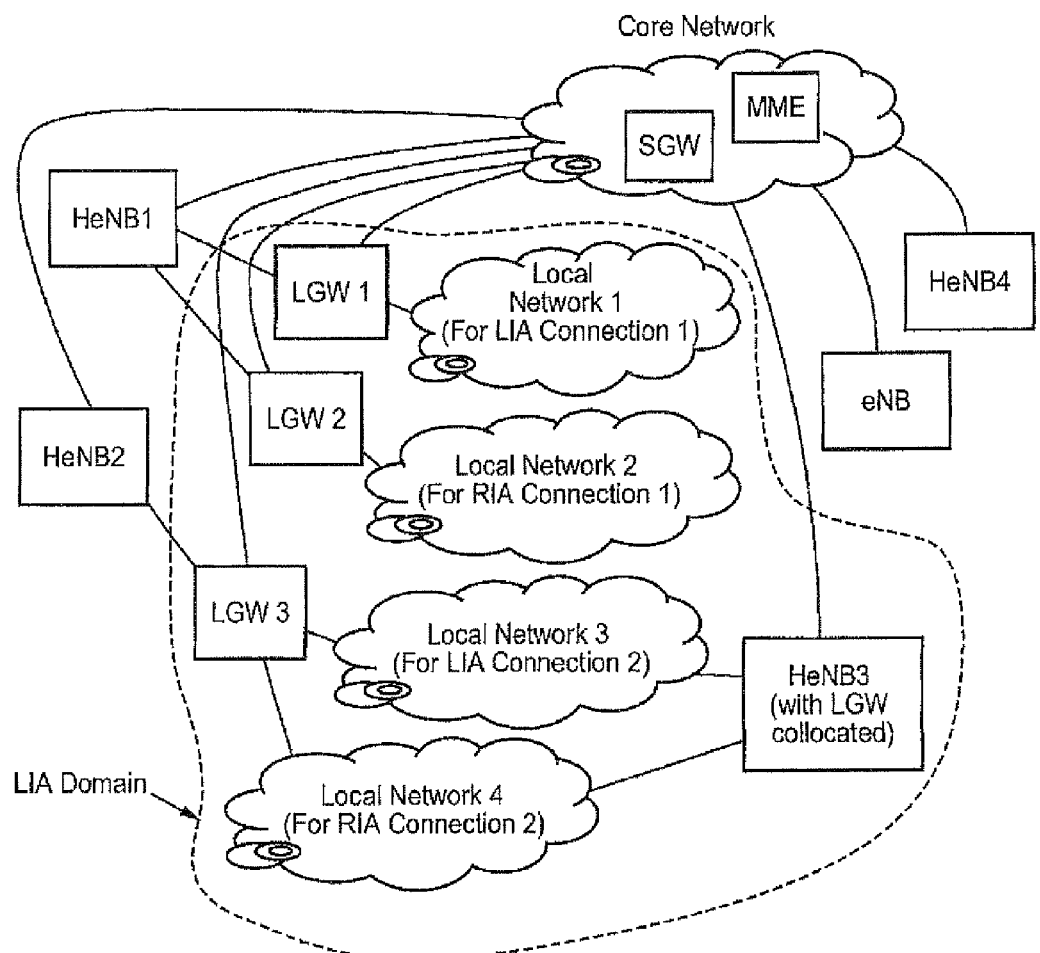
FIG. 14 is an example of a LIA domain according to the present invention.

FIG. 14 is a diagram showing an example of a configuration of a LIA domain to describe the embodiment, where multiple local networks, multiple LGWs, and multiple HeNBs are installed in the LIA domain. The local networks are divided into ones for LIA connection and ones for RIA. The LGWs are divided into one (LGW3) for accommodating multiple local networks and ones (LGW1, LGW2) for accommodating a single local network. Similarly, the HeNBs can be connected to multiple LGWs to establish optimized paths for LIA connection. When the LGWs are collocated with the HeNBs, some HeNB (HeNB3) may accommodate multiple local networks as well. The above configuration is assumed to describe the embodiment, and the same configuration is not necessarily required. An actual configuration is determined depending on the service provided.

In the above configuration, suppose that a UE tries to connect remotely to a local network from outside of home, i.e., a base station (eNB or HeNB4 that does not belong to the LIA domain in the figure) incapable of performing path optimization for LIA connection. As shown in the aforementioned embodiments, the UE can use APN (LIA-APN) for LIA in any case without becoming aware of whether the base station trying to connect is a base station capable of performing path optimization for LIA connection. This eliminates the need for the user to determine which of the LIA connection and the RIA connection is to be performed, so that can the burden on the user be reduced, but also the degree of freedom of access to the local network can be improved.

A UE's connection request (Attach Request, Service Request, or the like) is forwarded to the MME, and the MME sends a Create Bearer Request message (or Create Session Request message, note that it operates the same way regardless of which message is used unless otherwise indicated below). The Create Bearer Request message is forwarded to a LGW (hereinafter simply called LGW including a case were the LGW is collocated with an HeNB) (e.g., LGW3) through an SGW. At this time, the MME stores, in the message, one or more identifiers indicative of the location as UE's location information, such as cell ID or base station ID (e.g. (E)CGI: E-UTRAN Cell Global ID or Cell Global ID), CSG ID, tracking area ID (TAI), routing area ID (RAI), and location area ID (LAI).

The LGW processes the received Create Bearer Request message. In this process, if the stored UE's location information is acquired and it is confirmed that the connection is from a LIA capable location, i.e., from a base station (e.g., HeNB2) capable of performing path optimization, a connection of the UE to a local network for LIA connection (e.g., local network 3) is allowed, and a LIA connection path for the UE is established. This path is bound to a radio bearer for the UE later when the HeNB2 establishes an optimized path. The LGW may hold a list of base stations capable of performing path optimization, which is used for the above confirmation, to match it to the acquired UE's location information, or check with the base station indicated in the UE location information about the possibility of performing path optimization. When confirming that the connection is from a base station (e.g., eNB or HeNB4) other than the base stations allowing the UE to perform path optimization, the LGW3 permits the UE to connect to a local network for RIA connection (e.g., to local network 4) and establishes a RIA connection path for the UE. This path is bound to a currently established EPS bearer for the UE.

Here, the LGW can control the service content, access level, system or network capability, guaranteed QoS content, and security level provided from the local network depending on the location information on the UE. For example, when the UE has a connection from a location capable of performing LIA connection, the UE requests a service acknowledgment server (or application acknowledgment server) to establish a LIA connection path, permit all services, or increase the access level. Upon receipt of the request, the acknowledgment server gives approval thereto. Thus, the access limitation is relaxed on condition that the user data path is local (e.g., in-company access system or network) to enable improvement in user convenience for local access.

A path table and a packet filter managed by the LGW are configured such that all packets or traffic including broadcast or multicast data (or packets) are forwarded to the UE. This improves the degree of freedom of available protocols, applications, and services, so that applications and services having extensibility and flexibility can be provided.

Throughput as a characteristic of local access can also be improved. Therefore, the QoS settings between the local network and the LGW and between the LGW and the UE may be given preferential (e.g., the maximum/guaranteed bit rate of MBR/GBR or the like is set high, low transmission delay is guaranteed, or connection priority such as ARP (Allocation and Retention Priority) is set high). Further, the application of an additional security protocol (e.g., IPsec tunnel, or the like) can be released to improve throughput and reduce the terminal processing load.

On the other hand, when the UE tries a connection from a location incapable of performing LIA connection (i.e., RIA connection from a base station incapable of performing path optimization), the LGW establishes a path for RIA connection, and requests the service acknowledgment server (or application acknowledgment server) to permit only some of services or set the access level lower. Upon receipt of the request, the acknowledgment server gives approval thereto. Further, the path table and the packet filter managed by the LGW are configured such that broadcast data (or packets) and specific traffic or packets are not forwarded to the UE (or those to be forwarded are minimized) for the purposes of reducing traffic and protecting information). Further, to maintain proper throughput, the security level can be increased by optimizing the QoS settings between the local network and the LGW and between the LGW and the UE (e.g., the QoS setting between the LGW and the local network is aligned to bearer QoS between the LGW and the UE), instructing the UE to apply an additional security protocol (e.g., UE-LGW IPsec tunnel, or the like) depending on the service content (or starting the establishment of a secure tunnel from the LGW), or causing the MME to reconfigure the parameters for bearer security of the UE upon RIA connection (e.g., a more secure algorithm is applied).

Further, when the UE performs handover form a base station, where LIA connection for the UE is possible, to another base station, i.e., when the UE performs handover from. LIA connection to RIA connection (or vice versa), the MME notifies the LGW of UE's location information on handover destination using a Modify Bearer Request message in order to update the UE's location information. Based on the acquired UE's location information, the LGW selects a local network as a destination by the same method as that described above and performs processing. In other words, when switching over to the RIA connection, the procedure for establishing a path for RIA connection is performed, while when switching over to the LIA connection, the procedure for establishing a path for LIA connection is performed.

Upon LIA connection, although the LGW establishes the LIA connection path for the UE to the local network for LIA connection, when the HeNB does not establish an optimized path after a predetermined time elapses (i.e., when the optimized path establishing processing is not started), or in accordance with an instruction from another node, the LGW eliminates the LIA connection path previously established, and establishes a RIA connection path to the local network for RIA connection (i.e., it switches the path for the UE from. LIA connection to RIA connection). At this time, the configuration for RIA connection (e.g., QoS parameters and the like) may be used to reconfigure an EPS bearer. Further, when the LGW cannot establish a path to the local network for RIA connection (e.g., when the LGW cannot connect to the local network for RIA connection, when the LGW can connect to the local network for RIA connection but the UE is not permitted to perform access to the local network for RIA connection or RIA connection is not permitted, etc.), the LGW refuses the connection tried by the UE and ends the processing. Further, when the LGW cannot connect to the local network for RIA connection but knows any other LGW capable of connecting to the local network for RIA connection (as a result of database query or preconfiguration), the LGW may perform relocation processing. Specifically, the LGW sends a relocation request (including information on the address or the like of an LGW to be switched to) to the MME through an SGW, and the MME establishes an EPS bearer of the UE for the LGW as the switching destination and releases the previous EPS bearer with the LGW. Note that the instruction from another node is an LGW relocation instruction (or request) from the MME or HeNB, for example.

If the service content is changed, then additional service acknowledgement or access authentication may be required, or authentication/authorization parameters may be changed. In other words, authentication/authorization procedures that are not required upon LIA connection may be required upon establishing RIA connection the severity of which is more required. In such a case, when establishing RIA connection using the Attach or Service Request, handover, or the like, access authentication or service acknowledgement processing is performed using a password or access credential, security token, or the like. Alternatively, access authentication processing based on SIM or subscription data performed upon attachment is performed again upon switching from LIA connection to RIA connection, particularly by means of handover or the like. Further, the LGW may change the collection policy for charging data between RIA connection and LIA connection. For example, a policy for charging the RIA connection at a higher rate is applied because the RIA connection tends to consume more core network resources. Here, the LGW may notify the SGW of switching between the RIA connection and the LIA connection (or the SGW may voluntarily detect switching therebetween) so that the SGW will collect charging data upon RIA connection. The collection policy for charging data is acquired from. PCRF upon switching of LIA/RIA connection, or a policy previous set in the subscription data or the like is used.

Thus, the service content, capability, etc. can be switched between the LIA connection and the RIA connection, and hence a system having extensibility and flexibility can be provided. This can improve the convenience of a service provider or application provider, and since the quality of service or application is increased, user convenience can also be improved.

Next, description will be made about control of a destination network or a provided service through the selection of an LGW. When receiving a connection request (Attach Request, Service Request, or the like) from the UE, the MME searches for an LGW as the final receiver of the Create Bearer Request message. Based on the UE context (e.g. MM context), subscription data, local data, or the like, the MME regards the access from a CSG cell or base station (HeNB) capable of performing LIA connection as LIA connection, and assigns a LGW (e.g., LGW1) for LIA connection. If the access is from any other base station, the MME regards it as RIA connection, and assigns an LGW (e.g., LGW2) for RIA connection. Here, the LGW for LIA connection is to connect to a local network for LIA connection, and the LGW for RIA connection is to connect to a local network for RIA connection. However, an LGW (e.g., LGW3) that connects to both the network for LIA connection and the network for RIA connection may be selected. In this case, the selected LGW3 further selects an appropriate local network according to the procedure mentioned above.

Alternatively, the MME may add UE's location information when deriving an LGW address from APN (LIA-APN) to check with a name server (DNS: Domain Name Server). In other words, FQDN obtained by adding the UE's location information (e.g. (E)CGI, CSG ID, TAI, or the like) to the LIA-APN is sent to the DNS server, and the DNS server returns a corresponding LGW address. Here, as an entry related to the LGW for LIA connection, the FQDN obtained by adding the ID of a cell or base station capable of performing LIA connection, or TAI, to the LIA-APN, and the address of the LGW for LIA connection are preregistered in a DNS database.

Further, the MME may check with a base station (HeNB, eNB) as the destination about the address or identifier (i.e. FQDN) of an appropriate LGW. Upon receipt, the base station (HeNB) capable of performing LIA connection returns the address of an LGW for LIA connection, while a base station (eNB) incapable of performing LIA connection returns an LGW for RIA connection to the MME. When the identifier (FQDN) of an LGW is returned, the MME derives the address of the LGW by checking with the DNS using the FQDN. Further, when no address or identifier of an LGW address is returned from the base station, the MME derives the address of the LGW from the LIA-APN as usual.

The base station may instruct the MME of the type of local network as the destination. Thus, upon LIA connection, the MME stores information (LIA indication) indicative of LIA connection in a Create Bearer Request and sends it. Then, the LGW evaluates it to establish a path to the local network for LIA. Upon RIA connection, the MME stores information (RIA indication) indicative of RIA connection in a Create Bearer Request (or it stores no information) and sends it. Then, the LGW evaluates if to establish a path to the local network for RIA connection. It may be such that the RIA indication is stored upon RIA connection and no indication is stored upon LIA connection, or the LIA indication is stored upon LIA connection and no indication is stored upon RIA connection. In either case, the number of messages and the amount of system processing can be reduced.

These indications may be generated and stored in the messages based on the determination of the MME as to the availability of the LIA connection (as described in the aforementioned embodiments). Further, a HeNB may determine the availability of the LIA connection and sends them to the MME when receiving an inquiry from the MME, when forwarding the Attach Request or Service Request from the UES, or during the handover processing.

Further, the type of local network connected (for LIA connection or RIA connection) or the type of established connection (LIA connection or RIA connection) may be notified to the UE. This notification to the UE is made by any node, e.g. the MME, the LGW, and the HeNB, in any of the Attach Procedure, the Service Request Procedure, and the Handover Procedure. The method of notifying the UE may be such that an identifier indicative of the type of connection (LIA connection or RIA connection) is added to the APN and stored in any message in the above Procedure, and notified to the UE, or a flag for indicating the type of connection may be set in the message and notified to the UE. Thus, the UE can change the QoS setting according to the type of local network connected or the type of connection (such as to reconfigure the bearer using higher QoS setting in the case of LIA), or notify the application to perform configuration according to the type e.g., the address of the application server is changed between LIA connection and RIA connection.

When the LGW detects that traffic from the UE that has established the LIA connection has not occurred for a predetermined period of time, the LGW may temporarily switch the connection to the RIA connection. In other words, when the LGW cannot detect traffic from the UE for a predetermined period of time after the last traffic detection, the LIA connection path for the UE is switched (reconfigured) to an RIA connection path to the local network for RIA connection. This can prevent a malicious user from accessing the LIA network using the UE left direct access. To restart the LIA connection, authentication processing for password or the like may be requested.

Further, a base station (HeNB) having the optimum path for LIA connection detects that the radio bearer of the UE is released (but the EPS bearer remains), the base station may instruct the LGW to switch the LIA connection for the UE to the RIA connection. Alternatively, when the MME detects the transition of the UE to the idle mode, the MME may instruct the LGW using a message such as a Modify Bearer Request to switch over to the RIA connection, or when the LGW receives a message notifying the transition of the UE to the idle mode (or indicating the transition to the idle mode, the LGW may confirm the transition to the idle mode to switch over to the RIA connection.

In the above description, the example of the LTE architecture including HeNBs is described for ease of explanation, but if HNBs are applied instead of the HeNBs, the present invention can also be applied in the same manner even in a UMTS or GPRS architecture. When applying the HNB, an SGSN and a PDP context are used as substitutes for the MME and the EPS bearer used in the above description.

Each functional block used in the description of the embodiments as given above can be realized as LSI, typically represented by the integrated circuit. These may be produced as one chip individually or may be designed as one chip to include a part or all. Here, it is referred as LSI, while it may be called IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

Further, in the aforementioned embodiments, the optimization of the LIA connection for the HeNB or HNB as the target has been described. However, even if the HeNB or the HNB is replaced by a conventional macro base station, i.e., by an eNB (eNodeB) or an NB (NodeB), respectively, the same effects can be demonstrated without adding any special function, thus not affecting the essence of the present invention. This is particularly effective in forwarding traffic for the Internet from a macro base station along an optimized path. Specifically, a gateway function such as PGW is installed on a macro base station to forward traffic directly from the macro base station to the Internet (or traffic from the Internet is forwarded to the UE via the macro base station).

Industrial Applicability

The invention has the advantage of optimizing UE's LIA traffic without affect the traffic for the access to operator's core network. Therefore, the invention can be advantageously used as the management for the local IP access in a mobile communication system.

The invention claimed is:

1. A mobile terminal including one or more processors comprising memory and being configured to be connected to a local IP network, comprising:
   an obtaining unit configured to receive, through an operator network, optimization information sent from a gateway in the local IP network, the optimization information comprising service information describing, for each of multiple access nodes, one or more associated services in the local IP network that can be accessed by the mobile terminal through said access node;
   a selecting unit configured to select one of the multiple access nodes based on the service information; a deciding unit configured to decide based on the obtained optimization information whether a path optimization to the local IP network through the access node selected by the selecting unit is to be performed, wherein the deciding includes determining whether a cell ID associated with the selected access node matches a cell ID on a list of cell ID contained in the optimization information; and an instructing unit configured to send an instruction of path optimization to the selected access node when the deciding unit decides the path optimization through the selected access node is to be performed;

wherein the obtaining unit is further configured to obtain a token generated by the access node selected by the selecting unit, and the instructing unit is configured to send to the selected access node the instruction of path optimization that includes the obtained token.

2. A path optimization method to be performed between a gateway in a local IP network, capable of performing path optimization for the local IP network, and a mobile terminal capable of connecting to the local IP network, the path optimization method comprising:

a sending step performed at the gateway of generating optimization information and sending the optimization information through an operator network to the mobile terminal;

an obtaining step performed at the mobile terminal of receiving the optimization information, the optimization information comprising service information describing, for each of multiple access nodes, one or more associated services in the local IP network that can be accessed by the mobile terminal through said access node;

a selecting step performed at the mobile terminal of selecting one of the multiple access nodes based on the service information;

a deciding step performed at the mobile terminal of deciding, based on the obtained optimization information, whether a path optimization to the local IP network through the access node selected in the selecting step is to be performed, wherein the deciding includes determining whether a cell ID associated with the selected access node matches a cell ID on a list of cell IDs contained in the optimization information;

an instructing step performed at the mobile terminal of sending an instruction of path optimization to the selected access node when the deciding step decides the path optimization through the selected access node is to be performed; and a path optimizing step, performed at the selected access node, of receiving the instruction of path optimization from the mobile terminal and establishing an optimized path to the local IP network;

wherein the obtaining step includes obtaining a token generated by the access node selected in the selecting step, and the instructing step includes sending to the selected access node the instruction of path optimization that includes the obtained token.

* * * * *